(12) United States Patent
Gervasio

(10) Patent No.: US 12,119,525 B2
(45) Date of Patent: Oct. 15, 2024

(54) ELECTROCHEMICAL HYDROGEN COMPRESSOR FOR OPERATION AT PRESSURES EXCEEDING 12,500 PSI

(71) Applicant: Arizona Board of Regents on Behalf of the University of Arizona, Tucson, AZ (US)

(72) Inventor: Dominic Francis Gervasio, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 460 days.

(21) Appl. No.: 17/221,729

(22) Filed: Apr. 2, 2021

(65) Prior Publication Data
US 2021/0296676 A1      Sep. 23, 2021

Related U.S. Application Data

(62) Division of application No. 16/453,575, filed on Jun. 26, 2019, now Pat. No. 11,196,072.

(Continued)

(51) Int. Cl.
*H01M 8/12* (2016.01)
*F04B 43/00* (2006.01)
(Continued)

(52) U.S. Cl.
CPC ........... *H01M 8/1213* (2013.01); *F04B 43/00* (2013.01); *H01M 4/8605* (2013.01); *H01M 4/92* (2013.01);
(Continued)

(58) Field of Classification Search
CPC ............. H01M 8/1213; H01M 8/0258; H01M 8/0267; H01M 8/04029; H01M 8/04074;
(Continued)

(56) References Cited

U.S. PATENT DOCUMENTS

| 10,622,657 B1* | 4/2020 | Kim | ................... | H01M 8/1023 |
| 2019/0263661 A1* | 8/2019 | Bose | ................... | H01M 8/1016 |

FOREIGN PATENT DOCUMENTS

| EP | 3133689 | * | 2/2017 | .......... | H01M 8/0662 |
| TW | 201800455 | * | 1/2018 | ............. | H01B 13/00 |

OTHER PUBLICATIONS

Computer-generated translation of TW 201800455, Fukuda et al., "Ion-conducting Membrane Production Method And Production Device", Jan. 1, 2018.*

* cited by examiner

*Primary Examiner* — Raymond Alejandro
(74) *Attorney, Agent, or Firm* — Quarles & Brady LLP; Yakov Sidorin

(57) ABSTRACT

A novel electrochemical hydrogen compressor system for use in a fuel cell operating at gas pressure exceeding 12,500 psi. The system includes a membrane-electrode assembly containing a composite polymer membrane made from a blend of inorganic and organic polymers and a porous metal-catalyzed electrode structured to avert being raptured by the membrane at such pressure. In a specific case, the membrane is configured to operate without water and without losing proton-conductivity when exposed to water. Preparation and use of such compressor system.

19 Claims, 15 Drawing Sheets

Related U.S. Application Data

(60) Provisional application No. 62/690,069, filed on Jun. 26, 2018, provisional application No. 62/690,107, filed on Jun. 26, 2018, provisional application No. 62/690,093, filed on Jun. 26, 2018, provisional application No. 62/690,056, filed on Jun. 26, 2018, provisional application No. 62/690,078, filed on Jun. 26, 2018.

(51) Int. Cl.
| | |
|---|---|
| *H01M 4/86* | (2006.01) |
| *H01M 4/92* | (2006.01) |
| *H01M 8/0258* | (2016.01) |
| *H01M 8/0267* | (2016.01) |
| *H01M 8/04007* | (2016.01) |
| *H01M 8/04029* | (2016.01) |
| *H01M 8/1213* | (2016.01) |
| *H01M 8/10* | (2016.01) |

(52) U.S. Cl.
CPC ....... *H01M 8/0258* (2013.01); *H01M 8/0267* (2013.01); *H01M 8/04029* (2013.01); *H01M 8/04074* (2013.01); *H01M 2008/1095* (2013.01); *H01M 2300/002* (2013.01); *H01M 2300/0082* (2013.01); *H01M 2300/0091* (2013.01)

(58) Field of Classification Search
CPC ................ H01M 4/8605; H01M 4/92; H01M 2008/1095; H01M 2300/002; H01M 2300/0082; H01M 2300/0091; F04B 43/00
See application file for complete search history.

ELECTROCHEMICAL HYDROGEN COMPRESSOR FOR OPERATION AT PRESSURES EXCEEDING 12,500 PSI

CROSS-REFERENCE TO RELATED APPLICATIONS

This patent application is a divisional of and claims the benefit of the U.S. patent application Ser. No. 16/453,575, filed on Jun. 16, 2019 and now granted as U.S. Pat. No. 11,196,072, which claims the benefit of the Provisional Appls. Nos. 62/690,093; 62/690,078; 62/690,069; 62/690,107; and 62/690,056, each of which was filed on Jun. 24, 2019. The disclosure of each of the aforesaid applications is relied upon and is incorporated by reference herein in its entirety.

STATEMENT OF FEDERALLY SPONSORED RESEARCH AND DEVELOPMENT

This invention was made with government support under the grant numbers N00014-09-1-0695 awarded by NAVY/ONR; DE-FG36-06GO16029, and DE-AC05-00OP22725 awarded by U.S. Dept. of Energy. The government has certain rights in the invention.

FIELD OF THE INVENTION

The field of the invention relates generally to PEM fuel cells, the use and the preparation thereof. The field of the invention also relates generally to proton-conducting membranes (PEM), PEM fuel cells and more particularly to bipolar plates for separating adjacent fuel cells in a fuel cell stack, reformer and the use thereof for production of hydrogen-rich gas from hydrocarbons; and compression/storage of hydrogen economy.

BACKGROUND

This background information is provided for the purpose of making information believed by the applicant to be of possible relevance to the present invention. No admission is necessarily intended, nor should it be construed, that any of the preceding information constitutes prior art against the present invention.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

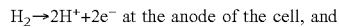

$H_2 \rightarrow 2H^+ + 2e^-$ at the anode of the cell, and

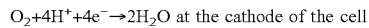

$O_2 + 4H^+ + 4e^- \rightarrow 2H_2O$ at the cathode of the cell

Generally, a good membrane for the PEM fuel cells has to meet the following criteria:
1) chemical and electrochemical stability in the fuel cell operating environment;
2) mechanical strength and stability under cell operating conditions;
3) high proton conductivity, low permeability to reactant gas, and high water transport; and
4) low production cost.

Cation exchange e polymers based on poly 2,2-(m-phenylene)-5,5'-bibenzimidazole (PBI) having the following structure:

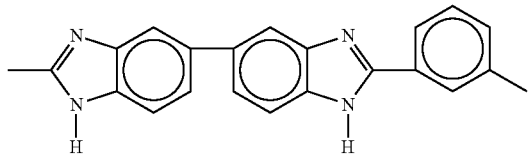

have been traditionally used in PEM fuel cell electrolytes. PBI has been commonly used because it has been found to possess inherent thermal and chemical stability resulting from its aromatic property. This polybenzimidazole also possesses good mechanical strength and is commercially available. They are also reasonably tractable and can be dissolved in N,N-dimethyl acetamide, dimethyl sulfoxide, and N-methyl-2-pyrrolidone.

Other polyelectrolytes for PEM fuel cell use include Nafion® (Dupont; Wilmington, Del.) commercially available from a perfluorinated aliphatic polysulfonic acid and sulfonated polystyrene, described in U.S. Pat. Nos. 3,282,875 and 4,330,654. Nafion® possesses good proton conductivity and excellent chemical stability, but suffers from high cost and intractability. Additionally, sulfonated polystyrene lacks chemical and thermal stability and tends to limit its use in PEM fuel cell applications. PBI has been promoted as a solution to these deficits.

One aspect of the invention pertains to an inorganic-organic composite polymeric material that is superior to PBI and other materials traditionally used in polymer electrolyte membranes (PEMs). This inorganic-organic composite PEM avoids the limitations of polybenzimidazole-based (PBI-based) fuel cells, enabling operation over a wider range of conditions than existing PBI fuel cell technology.

For example, the PA-dopedQAPOH PEMs can conduct protons through stable ionic pair complexes and enable fuel cell operation at temperatures from room temperature to about 200° C. Phosphoric acid-doped polybenzimidazole (PA-doped PBI) has a proton from PA located between biphosphate anion and benzimidazole. But benzimidazole is a weak base so the proton remains closer to the biphosphate anion, so benzimidazole-H—$H_2PO_4$ interaction is relatively weak. The intermolecular interaction energy between benzimidazole and PA is computed as 17.4 kcal/mol, which is comparable to interaction of biphosphate with water so biphosphate washes out of PBI. On the other hand, the intermolecular interaction energy between benzyltrimethylammonium (BTMA) and the biphosphate anion is computed as 151.7 kcal/mol, which is 135.4 kcal/mol greater than the interaction between biphosphate and one water molecule and 134.3 kcal/mol tan in PBI. This keeps the phosphate from coming out of benzyltrimethylammonium (BTMA) when it is washed in water.

A typical fuel cell has a terminal voltage of up to one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow-channel plates (graphite composite or metal plates, as examples) that are stacked one on top of the other. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow channels and diffuse through the GDLs to reach the PEM. The PEM and its adjacent pair are often assembled together in an arrangement called a membrane electrode assembly (MEA).

A fuel cell system may include a fuel processor that converts a hydrocarbon (natural gas or propane, as examples) into a fuel flow for the fuel cell stack.

There is a continuing need for integrated fuel cell systems designed to operate in a robust, cost-effective manner.

Hydrogen Compression

Traditionally, it is challenging to find an efficient and cost effective means of compressing hydrogen. PEM has been found to play a role in hydrogen compression. Hydrogen has been touted as an ideal chemical for storing solar, wind, biomass and other renewable powers. The hydrogen economy is a system proposed for delivering the energy stored as hydrogen. A major barrier to using the hydrogen economy is the storing of hydrogen. Hydrogen has large energy per unit mass, but low energy per unit volume, because hydrogen is a gas at room temperature and pressure. Further, because hydrogen gas has a low viscosity, hydrogen is difficult to mechanically compress. For at least these reasons there is a great need to find a cost-effective way to compress hydrogen.

Electrical compression of hydrogen is effective using high strength palladium (Pd) metal membranes, but not practical, because palladium is expensive, and its surface is susceptible to fowling.

The present invention also encompasses an electrochemical compressor that is much less expensive and less susceptible to fowling. The inventor found that use of proton conducting membranes for purifying hydrogen can be achieved by oxidizing impure hydrogen at the anode to protons and reducing protons conducted to the cathode to high purity hydrogen. Hydrogen compression has not been reported with these types of systems, because, to date, there are no high strength proton-conducting membranes and membrane electrode assemblies available for compressing hydrogen.

SUMMARY

The inventors surprisingly developed that a robust, cost effective fuel cell stack that provides good value for energy storage. Furthermore, the inventors have developed a robust, efficient, high power and high energy density electric generating system fueled by hydrocarbons reformed to hydrogen rich gas with useful by-products such as potable water and usable heat.

In one aspect of the invention, the fuel cell is disclosed comprises one or more inorganic and organic composite polymer membrane electrode assemblies and two or more liquid-cooled metallic bipolar plates.

In some embodiments, the fuel stack includes membrane electrode assemblies (MEAs) comprising proton conducting membrane, and which are sandwiched between two metal-catalyzed porous gas-fed electrodes. In some embodiments, porous gas-fed electrodes are catalyzed by a metal catalyst derived from a transition metal, or other precious metal. For example, the metal catalyst may be derived from platinum, palladium, gold, silver, rhodium, and the like.

In some embodiments, the MEA used in the invention is a commercial phosphoric acid loaded polybenzimidazole (PA-PBI). In further embodiments, the MEA used in the invention is a composite inorganic-organic polymer membranes which operate at high temperature (up to about 200° C.) and which have no need for hydration for proton conduction and are tolerant to carbon monoxide (CO) for thousands of hours.

A further aspect of the invention encompasses a fuel cell stack comprising a liquid cooled metallic bipolar plates to replace the conventional graphite plates and the cooling plates for size and weight reduction and new composite proton conducting membranes in the membrane electrode assemblies to operate at high temperatures with no water and will not lose phosphoric acid if exposed to liquid water.

Polymer Electrolyte Membrane (PEM)

The inventor also surprisingly discovered that PEM performance can improved (when compared with traditional PEMs) by using an inorganic-organic composite membrane by blending two inorganic and organic components and optimizing the proton (H+) conduction while minimizing molecular hydrogen ($H_2$) permeation through the membrane. One aspect of the invention comprises:
1) an organic proton conductor (e.g., an organic polymer such as an organic polymer made from polyvinyl pyridinium phosphate (PVPP)); and
2) an inorganic proton conductor (e.g., an inorganic polymer such as an inorganic polymer made from indium tin phosphate or ITP)

One advantage of the inorganic and organic components used in some embodiments of the invention is they conduct only protons with no electroosmotic drag of molecular species, like water, and may operate from room temperature and improve, as predicted by the Arrhenius equation, up to 150° C. and higher. Consequently, in such embodiments there is no need for hydration and no degradation of membrane properties (e.g., from leaching of ions) for RH up to 50%.

Electrochemical Hydrogen Compressor (HC)

Another aspect of the invention pertains to an electrochemical hydrogen compressor (HC) comprising an inorganic-organic composite proton-conducting polymer electrolyte membrane (PEM) in a membrane electrode assembly (MEA), a three-layer laminate of anode, membrane and cathode. In some embodiments, when electrical power is applied across the MEA, the anode electrochemically converts low-pressure hydrogen ($H_2$) gas to protons ($H^+$), which the PEM sends to the cathode, where the protons are electrochemically converted to higher pressure hydrogen gas. The HC also purifies hydrogen, because only hydrogen is converted to proton at the anode, so impurities like nitrogen, oxygen, etc. are left behind and separated from the hydrogen.

The compressor may be a single cell, or more than one cell arranged in a series. In some embodiments, the low pressure of hydrogen supplied to the first anode (of first cell in a series of cells) is raised in pressure by the first cathode, and this higher pressure hydrogen is the outlet of that first cell. The higher-pressure hydrogen gas, which is the outlet from the cathode of the first cell, is the inlet hydrogen gas supplied to the anode of the second cell in series. The hydrogen pressure at this second anode is raised by the second cathode of this second cell, which is the higher pressure hydrogen feed to the third anode of the third cell, and the pressure of the hydrogen gas at the third anode is raised by the third cathode, which feed to the next anode, and pressured by the next cathode, and so on, using as many cells in series to raise the hydrogen pressure to the desired value of pressure. Raising hydrogen gas pressure compresses hydrogen gas volume (as can be estimated by the ideal gas law, PV=nRT in which P is gas pressure, V is gas volume is the moles of hydrogen, R is the gas constant (8.2×10-5 m3 atm K-1 mol-1) and T is the temperature). Reducing the volume is desired for compact hydrogen storage.

In some embodiments, each cell in the compressor uses a composite proton-conducting electrolyte membrane (PEM). This composite PEM is made of an inorganic component and an organic component. In some embodiments, the composite PEM comprises inorganic and organic components, which are an inorganic polymer and an organic polymer, respectively. The organic polymer may be based on quaternary ammonium (QA)-biphosphate ion-pair-coordinated polyphenylene (PA-dopedQAPOH). The inorganic polymer may be based on a ceramic, inorganic polymer, such as, 10 mol % indium 90% tin pyrophosphate ($In_{0.1}Sn_{0.9}P_2O_7$ or ITP for short). [See e.g., Y. Jin, K. Fujiwara, T. Hibino, Electrochemical and Solid-State Letters, 13 (2) B8-B10 (2010) ("Hibino"]. In further embodiments, the inorganic-organic composite membrane may have 70 to 90% inorganic polymer (e.g., ITP) whose pores are filled with 30 to 10% organic polymer (e.g., PA-dopedQAPOH), respectively.

In some embodiments, the hydrogen compressor builds up hydrogen pressure because the composite membrane is permeable to proton but is not permeable to molecular hydrogen ($H_2$). The membrane electrode assembly (MEA) may comprise a three layer laminate of anode membrane and cathode, wherein the MEA is mounted between two high-strength porous metal current-collectors. One function of mounting the MEA between two high-strength porous metal current-collectors is to at least give physical support to the MEA and/or to prevent gas blowing through the membrane and anode from the high hydrogen gas pressure formed on the cathode. One embodiment is an electro oxidation and reduction catalyst, like Pt, that is directly coated on the high strength porous metal support, like a porous nickel foil, in which the pores of the foil are smaller pores than the pore size of the inorganic ceramic powder.

One aspect of the invention comprises a composite polymer membrane made from a blend of a proton-conducting inorganic particle and a soft organic proton-conducting particle.

Another aspect of the invention comprises a composite polymer membrane made from a blend of a proton-conducting inorganic particle and a soft organic proton-conducting particle; and a high strength porous metal support It is to be understood that both the foregoing general description of the invention and the following detailed description are exemplary, and thus do not restrict the scope of the invention.

BRIEF DESCRIPTION OF THE FIGURES

Fuel Cell

FIG. 9 depicts the gas chromatography spectrum of the original commercial Jet A fuel purchased from a local aviation company.

FIG. 4 shows the reformate molar fraction variation under different feeding temperatures, with and without catalyst for exemplary embodiments.

DETAILED DESCRIPTION 1.0. Definitions

Figure 1:
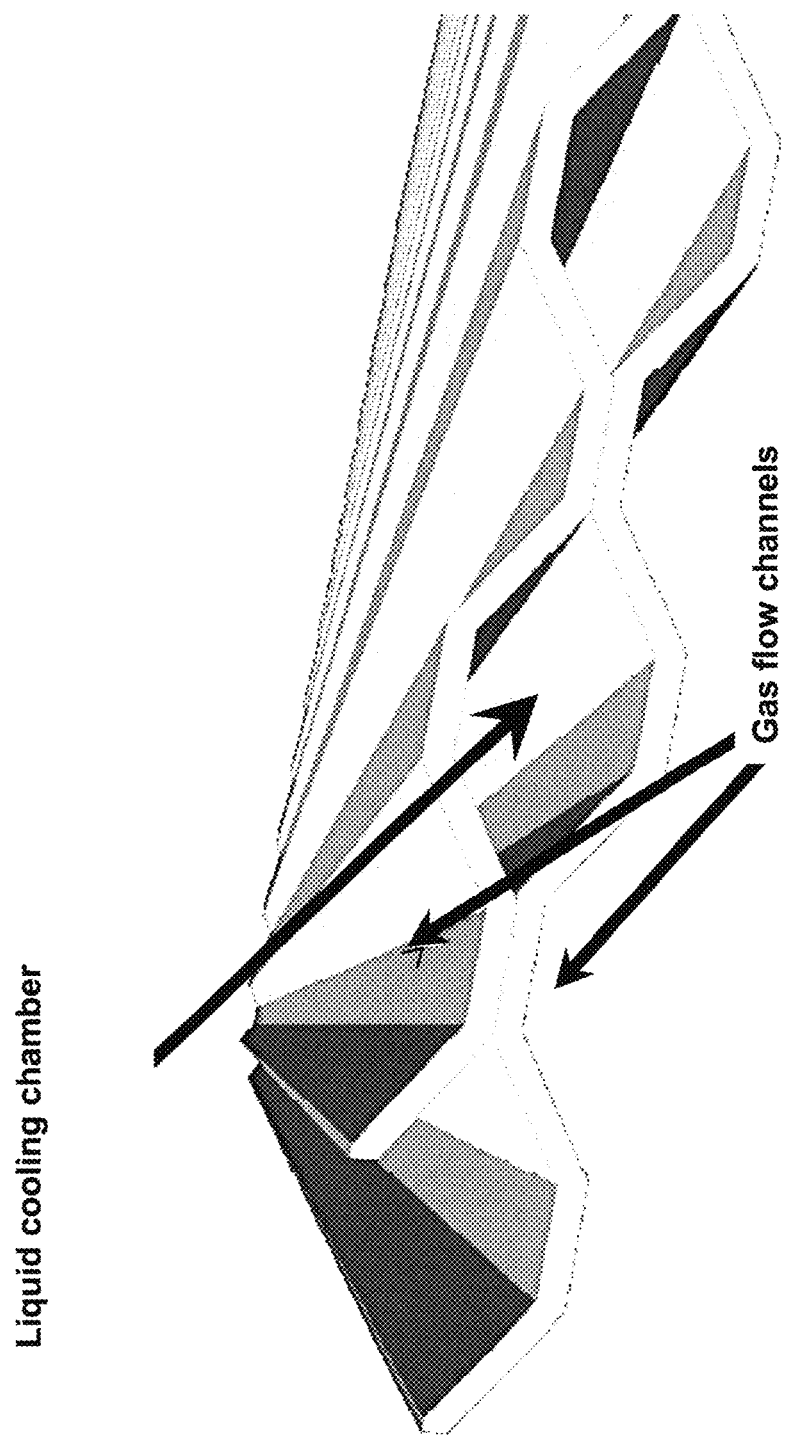
FIG. 1. A cross section of an exemplary metallic bipolar plate with cooling channels. Specifically, a cross section of a bipolar plate with a liquid cooling chamber inside and gas flow channels outside.

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated invention, and further applications of the principles of the invention as illustrated therein are herein contemplated as would normally occur to one skilled in the art to which the invention relates.

Unless defined otherwise, all technical and scientific terms used herein have the same meaning as commonly understood by one of ordinary skill in the art to which this invention pertains.

For the purpose of interpreting this specification, the following definitions will apply and whenever appropriate, terms used in the singular will also include the plural and vice versa. In the event that any definition set forth below conflicts with the usage of that word in any other document, including any document incorporated herein by reference, the definition set forth below shall always control for purposes of interpreting this specification and its associated claims unless a contrary meaning is clearly intended (for example in the document where the term is originally used).

The use of "or" means "and/or" unless stated otherwise.

The use of "a" or "an" herein means "one or more" unless stated otherwise or where the use of "one or more" is clearly inappropriate.

The use of "comprise," "comprises," "comprising," "include," "includes," and "including" are interchangeable and not intended to be limiting. Furthermore, where the description of one or more embodiments uses the term "comprising," those skilled in the art would understand that, in some specific instances, the embodiment or embodiments can be alternatively described using the language "consisting essentially of" and/or "consisting of."

The term "high temperature PEM fuel cell" refers to a fuel cell that may be operated at a temperature from about −50° C. to about 230° C., and that utilizes a polymer electrolyte membrane to support the fuel cell reaction. It should be noted that phosphoric acid, molten carbonate, alkaline and solid oxide fuel cell systems, which all operate at temperatures above 100° C., are not considered PEM systems since they do not utilize a polymer electrolyte membrane. Polybenzimidazole (PBI) and polyether ether ketone (PEEK) based fuel cell systems are considered high temperature PEM fuel cell systems, as examples.

As used herein, the term "organic polymer" as used herein refers to an organic polymer that is a proton conductor e.g., an organic polymer made from polyvinyl pyridinium phosphate (PVPP).

As used herein, the term "inorganic polymer" as used herein refers to an inorganic polymer that is a proton conductor (e.g., an inorganic polymer made from indium tin pyrophosphate or ITP).

The term "organic component" is used interchangeably with organic polymer herein.

The term "inorganic component" is used interchangeably with inorganic polymer herein.

The terms "composite membrane", "composite polymer member", "inorganic-organic composite membrane", and "inorganic-organic membrane" are used interchangeably with PEM to refer to an inorganic-organic composite proton-conducting polymer electrolyte membrane as disclosed herein.

The term "bipolar plate" is used interchangeably with the terms "BPP" and "plate" to refer to a bipolar plate comprising one or more liquid cooling chambers and one or more gas flow channels, wherein said plate is optionally laminated with a thin layer of a conductive material (on part of, or on the entire, surface of the bipolar plate). In some embodiments, the term "bipolar plate" includes a bipolar plate comprising one or more liquid cooling chambers inside and one or more gas flow channels outside, wherein said plate is optionally laminated with a thin layer of a conductive material (on part of, or on the entire, surface of the bipolar plate).

As used herein, the term "hydrocarbon" to include hydrocarbon and mixtures therefore including hydrocarbon-based/derived fuels. Hydrocarbon is used interchangeably with HC, and fuel to refer to hydrocarbon, and mixtures thereof, including hydrocarbon-based fuels with may include sulfur-based compounds.

The terms "the electrochemical hydrogen compressor" is used interchangeably with "HC" herein to refer to an electrochemical hydrogen compressor according to the present invention.

The terms "composite membrane", "composite polymer member", "inorganic-organic composite membrane", and "inorganic-organic membrane" are used interchangeably with PEM to refer to proton-conducting polymer electrolyte membrane as disclosed herein.

In one aspect of the invention, the fuel cell stack may be operated at a temperature between about −50° C. to about 230° C. In some embodiments, the fuel cell stack may be operated at a temperature between about 150° C. to about 230° C. In some embodiments, the fuel cell stack may be operated at a temperature between about 150° C. to about 230° C. In further embodiments, the fuel cell stack may be operated at a temperature between 160° C. to about 200° C. In further embodiments, the fuel cell stack may be operated at a temperature between 170° C. to about 190° C. In further embodiments, the fuel cell stack may be operated at a temperature between about 175° C. to about 185° C. In further embodiments, the fuel cell stack may be operated at a temperature between about 180° C. to about 185° C. In further embodiments, the fuel cell stack may be operated at a temperature between about 180° C. to about 230° C. In further embodiments, the fuel cell stack may be operated at a temperature between about 190° C. to about 220° C. In further embodiments, the fuel cell stack may be operated at a temperature between about 190° C. to about 200° C. In further embodiments, the fuel cell stack may be operated at a temperature of about 180° C. In further embodiments, the fuel cell stack may be operated at a temperature of about 220° C.

One aspect of the invention encompasses fuel cell stack comprising:
  a. one or more high temperature membrane electrode assemblies (MEAs); and
  b. a bipolar plate comprising one or more liquid cooling chambers and one or more gas flow channels.

Another aspect of the invention encompasses fuel cell stack comprising:
  a. one or more high temperature membrane electrode assemblies (MEAs);
  b. a bipolar plate comprising one or more liquid cooling chambers and one or more gas flow channels; and
  c. a compact unit.

In some embodiments, the fuel cell may optionally comprise a hydrogen compressor, e.g. as described herein. A further aspect of the invention encompasses fuel cell comprising:
  a. one or more high temperature membrane electrode assemblies (MEAs);
  b. a bipolar plate comprising one or more liquid cooling chambers and one or more gas flow channels;
  c. a compact unit; and
  d. a hydrogen compressor.

In some embodiments, the MEA operate from water subfreezing temperatures in, for example, a "craw mode" to, e.g., 180° C. in normal operation to as high as about 220° C.

In some embodiments, (MEAs) are comprised of one or more proton conducting membrane sandwiched between two metal-catalyzed porous gas-fed electrodes. In further embodiments, the membrane electrode assemblies (MEAs) are sandwiched between two platinum-catalyzed porous gas-fed electrodes. In some embodiments, the high temperature membrane electrode assemblies (MEAs) provide 1 to 100 kilowatt of power at typically 180° C. in normal operation to as high as 220° C.

In some embodiments, the fuel stack comprises two or more corrosion resistant metal bipolar plates. In further embodiments, the some or all of the surface of the metal bipolar plate is laminated.

In some embodiments, the fuel stack further comprises one or more cooling plates.

In some embodiments, the fuel stack further comprises one or more seals.

In some embodiments, the fuel stack further comprises one or more end plates.

In some embodiments, the fuel stack is a short stack (1 kW). A short stack can be a few as 1 cell having an active area of 250 cm$^2$ to generate about 30 watts, or 10 cells to generate about 300 watts or has approximately 30 cell to give approximately 1 kilowatt when each cell has an active area of 250 cm$^2$.

In some embodiments, the fuel stack is an extended liquid cooled 1 kW.

In some embodiments, the fuel stack is a multikilowatt fuel cell stack.

Figure 2:
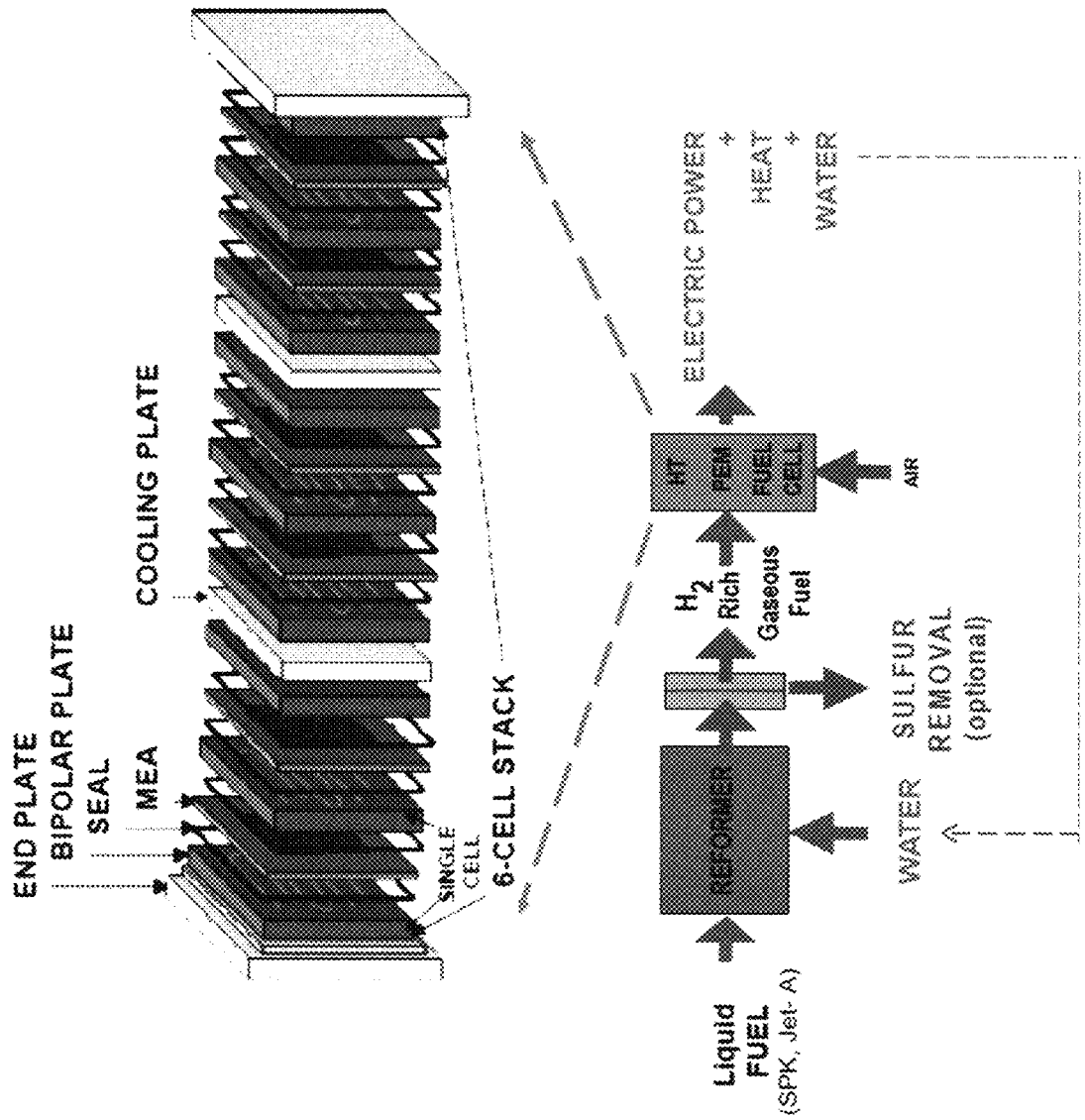
FIG. 2. High temperature PEM fuel cell stack with metallic bipolar plates juxtaposed with schematics of electric generating system (an exemplary embodiment of the invention)
Figure 3:
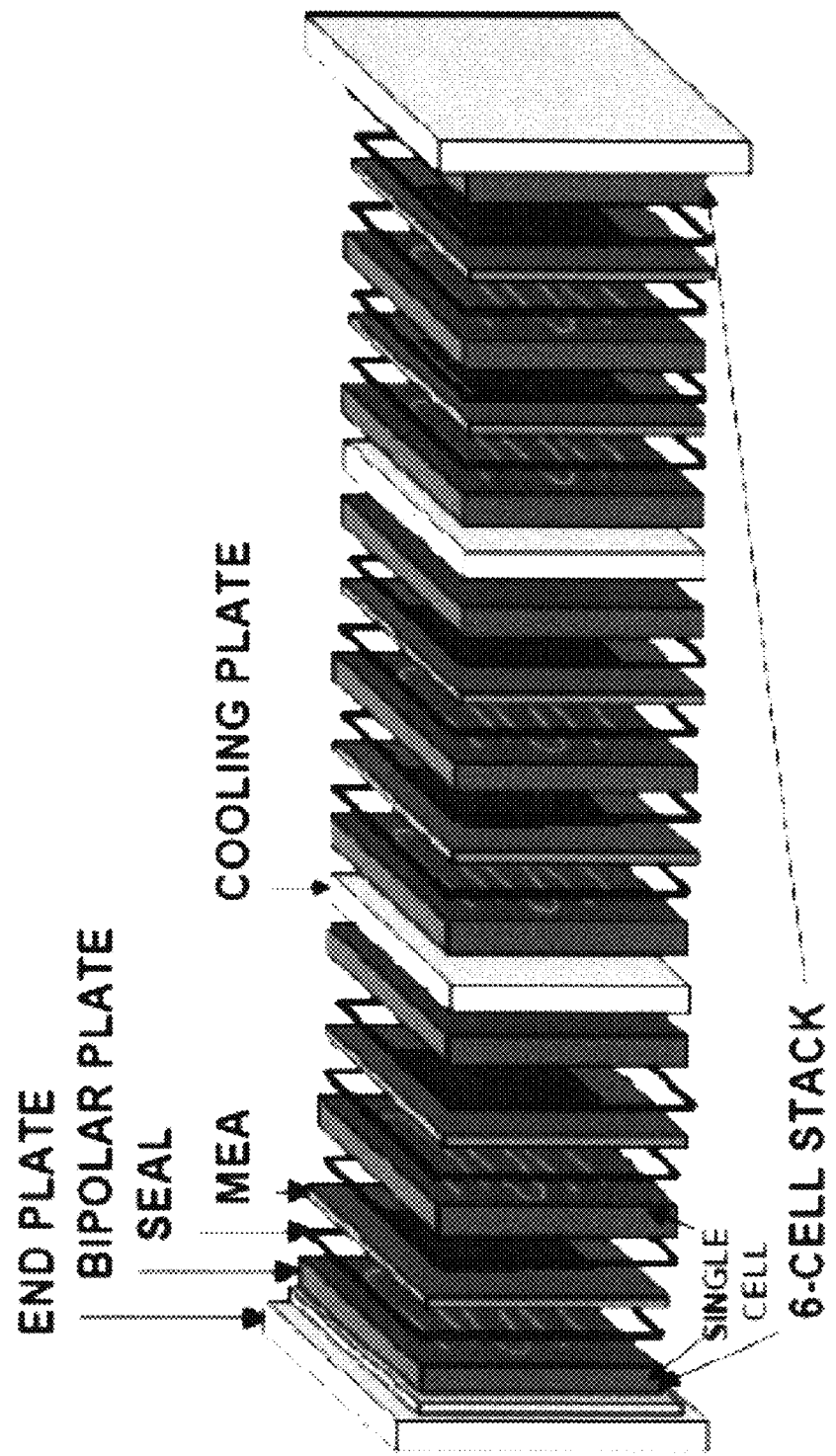
FIG. 3. Six-cell stack with conventional bipolar plates made of milled graphite for collecting current from and directing gas to the membrane electrode assemblies. Also cooling plates are periodically placed in the stack. There are 2 plates shown in this six cell stack.

One aspect of the invention encompasses a fuel stack according to FIG. 2.

Another aspect of the invention encompasses an electricity generating system according to FIG. 2.

A further aspect of the invention encompasses an electricity generating system comprising:
 a. one or more high temperature membrane electrode assemblies (MEAs);
 b. a bipolar plate comprising one or more liquid cooling chambers and one or more gas flow channels;
 c. a compact unit; and
 d. a hydrogen compressor.

Another aspect of the invention encompasses a system comprising a fuel stack disclosed herein and a compact unit. In some embodiments, the system generates electricity. In further embodiments, the system generates heat or potable water.

Another aspect of the invention encompasses a method of generating electrical power comprising applying a liquid fuel into a system according to FIG. 2. A further aspect of the invention encompasses a method of generating electrical power comprising applying a liquid fuel into a system according comprising a compact unit and a PEM fuel cell stack comprising (a) one or more high temperature membrane electrode assemblies (MEAs); and (b) a bipolar plate comprising one or more liquid cooling chambers and one or more gas flow channels.

Figure 4:
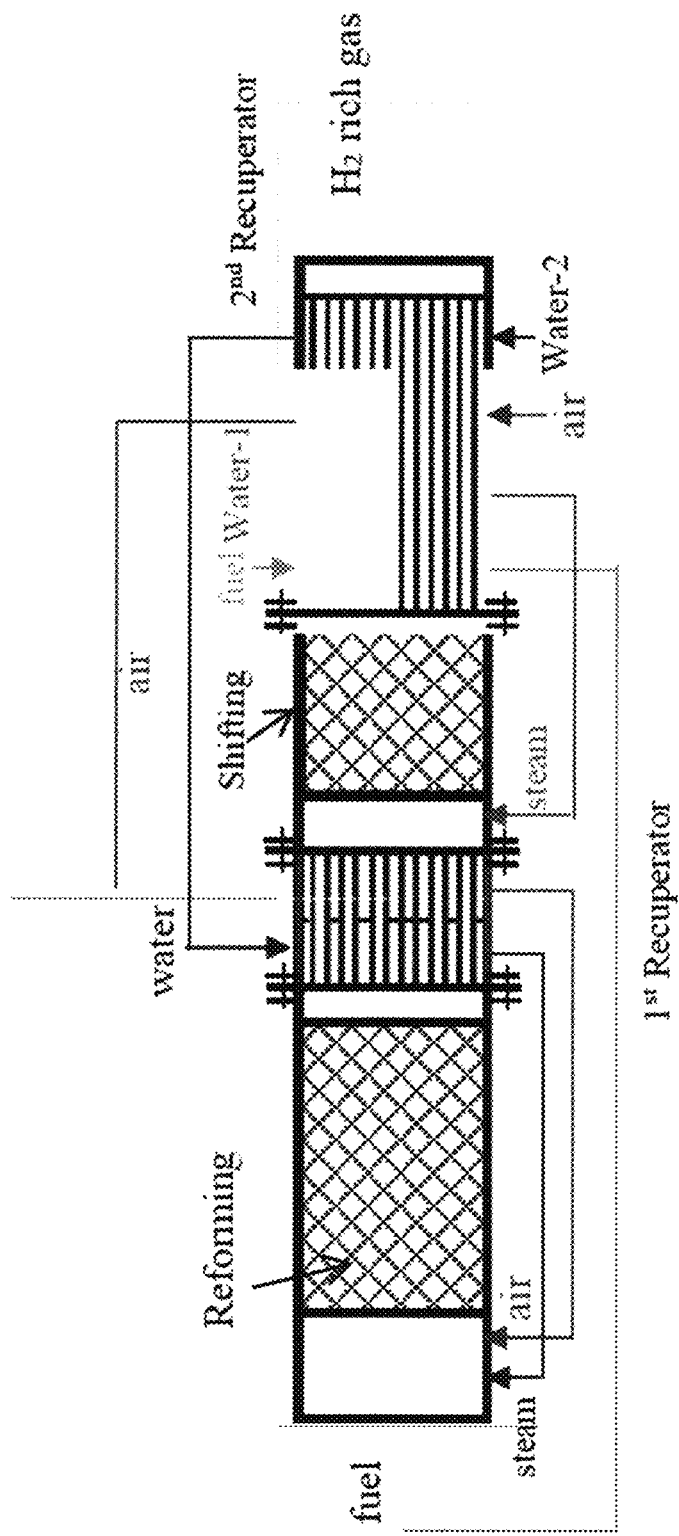
FIG. 4. Exemplary schematics of integrated reformer and water-gas-shifting
Figure 5:
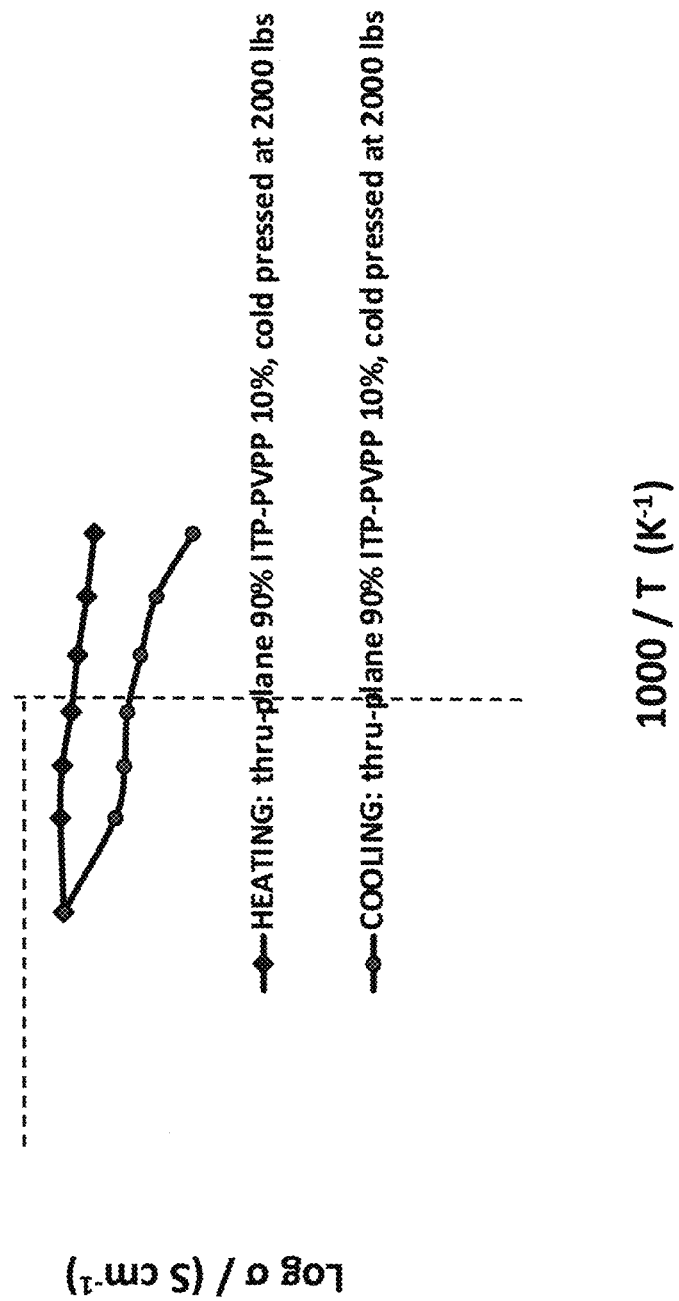
FIG. 5. Arrhenius plot of 90% ITP-10% PVPP measured by electrochemical impedance spectroscopy (EIS) thru-plane of membrane in a Teflon cell with VITON gaskets under dry $H_2$. Frequency was 500 kHz to 10 Hz. Modulation amplitude was 10 mV. The ITP-PVPP membrane was cold pressed at 25C (1.5 mm thick) with 20 nm of sputtered Pt (active area 0.5 cm2) with ETEK Pt/C (0.5 mg/cm2) as a gas diffusion layer and Pt gauze as primary current collectors. Run #2 ITP-J9 and PVPP.

A further aspect of the invention encompasses a method of generating electrical power comprising applying a liquid fuel into a system according comprising a compact unit according to FIG. 4 and a PEM fuel cell stack comprising (a) one or more high temperature membrane electrode assemblies (MEAs); and (b) a bipolar plate comprising one or more liquid cooling chambers and one or more gas flow channels, e.g., according to FIG. 1.

The liquid fuel includes sulfur free biofuel such as synthetic paraffinic kerosene, or a sulfur laden diesel fuel or a gas like natural gas. These fuels are fed to the reformer where they are converted to hydrogen rich gas, with less than 2 vol % CO and less than 10 ppm of sulfur. This hydrogen rich gas is the anode feed of the high temperature fuel cell, typically operating at 180° C. Furthermore, the liquid fuel may be jet fuel such as Jet-A, Jet-8 or Jet-5. Additionally, the liquid fuel may include jet fuel containing synthetic paraffinic kerosene (SPK).

Another aspect of the invention encompasses a method of generating heat comprising applying a liquid fuel into a system according to FIG. 2.

Another aspect of the invention encompasses a method of generating water comprising applying a liquid fuel into a system according to FIG. 2.

Another aspect of the invention encompasses a method of removing sulfur from a liquid fuel comprising applying a liquid fuel into a system according to FIG. 2.

Another aspect of the invention encompasses a method of preparing hydrogen ($H_2$)-rich gaseous fuel comprising applying a liquid fuel into a system according to FIG. 2. The resulting hydrogen-rich gas have less than 2 vol % CO and less than 10 ppm of sulfur, at least 50 vol % is hydrogen and the balance is nitrogen.

Another aspect of the invention encompasses a method of fabricating a fuel stack according to the invention comprising assembling:
 (a) one or more high temperature membrane electrode assemblies (MEAs) which operate from water subfreezing temperatures in, for example, a "craw mode" to, e.g., 180° C. in normal operation to as high as 220° C.; and
 (b) a bipolar plate comprising a liquid cooling chamber and gas flow channels;

Another aspect of the invention encompasses a method of fabricating a fuel stack according to the invention comprising assembling the components of the invention as listed in FIG. 2 in the order illustrated in FIG. 2.

Another aspect of the invention encompasses a method of operating a fuel cell system, comprising contacting a hydrogen rich gaseous fuel and air with a fuel stacking according to the invention, as exemplified, by e.g., FIG. 2.

Compact Units

One aspect of the invention encompasses a compact unit, wherein said compact unit comprises a hydrocarbon auto-thermal reformer (ATR), a water-gas shift (WGS) reactor, and two or more heat recuperators.

In further embodiments, the compact unit comprises a hydrocarbon auto-thermal reformer (ATR), a water-gas shift (WGS) reactor, and two heat recuperators. The hydrocarbon auto-thermal reformer (ATR), the water-gas shift (WGS) reactor, and heat recuperators may be arranged as illustrated in FIG. 4.

In some embodiments, the hydrocarbon auto-thermal reformer (ATR) is located at the front of the unit.

In some embodiments, the heat recuperator comprises one or more stainless steel straight tubes or coiled tubes. In further embodiments, the stainless steel coil is 1/8 inch thick.

Another aspect of the invention encompasses a method of generating electricity comprising operating a compact unit according to FIG. 4.

In some embodiments, the compact unit further comprises an injection section.

Another aspect of the invention encompasses a method of generating electricity comprising converting a hydrocarbon to a hydrogen rich fuel by contacting hydrocarbon with a compact unit, optionally removing sulfur, contacting said hydrogen rich gaseous fuel with a fuel stack disclosed herein to obtain a heat and/or potable water and/or electricity.

The inventors found that recuperators may be used to control the temperature of feed-in fuel, air, and steam for the ATR, and also the reformate entering to WGS reactor. Further, the temperature control allows the best reaction kinetics and conversion of hydrocarbon fuel into hydrogen rich fuel.

Another aspect of the invention encompasses a method of generating electricity comprising:
- contacting a hydrocarbon (e.g. fuel such as jet fuel) with a hydrocarbon auto-thermal reformer (ATR) to obtain a reformate,
- passing the reformate through a first heat recuperator;
- optionally, adding extra water;
- passing the reformate through a water-gas shift reactor for CO to react with $H_2O$ and obtaining more $H_2$;
- passing the reformate through a second heat recuperator;
- optionally removing sulfur and/or sulfur compounds, or a mixture thereof;
- isolating a hydrogen rich fuel product.

Another aspect of the invention encompasses a method of generating electricity comprising:
- contacting a hydrocarbon (e.g. fuel such as jet fuel) with a hydrocarbon auto-thermal reformer (ATR) to obtain a reformate,
- passing the reformate through a first heat recuperator;
- optionally, adding extra water;
- passing the reformate through a water-gas shift reactor for CO to react with $H_2O$ and obtaining more $H_2$;
- passing the reformate through a second heat recuperator;
- optionally removing sulfur and/or sulfur compounds, or a mixture thereof;
- isolating a hydrogen rich fuel product;
- contacting a hydrogen rich fuel product with a fuel cell, optionally storing electrical power.

In some embodiments, the hydrocarbon is jet fuel, dodecane, diesel, gasoline, ethanol, or methanol, or mixtures thereof. In some embodiments, the hydrocarbon is Jet A fuel, Jet-8 fuel, or Jet-5 fuel.

In some embodiments, the hydrocarbon auto-thermal reformer is operated at temperature from about 500° C. to about 700° C. In further embodiments, the hydrocarbon auto-thermal reformer is operated at temperature from about 450° C. to about 750° C.

In some embodiments, the reformate is cooled to a temperature from about 250° C. to 350° C. In some embodiments, the reformate is cooled to a temperature from about 200° C. to 400° C.

Another aspect of the invention encompasses a method of generating electricity, said method comprising the removal sulfur from a sulfur laden feed comprising contacting a sulfur laden feed with a compact unit as disclosed herein. In some embodiments, the sulfur laden feed comprises propane, natural gas, or jet fuel. In further embodiments, the jet fuel further comprises one or more synthetic paraffinic kerosene (SPK).

Membrane Electrode Assemblies (MEAs)

One aspect of the invention pertains to a membrane electrode assembly (MEAs).

The membrane electrode assemblies (MEAs) may be proton conducting membrane (PEM) sandwiched between two metal-catalyzed porous gas-fed electrodes. In some embodiments, the metal catalyst is platinum. These can be commercial phosphoric acid loaded polybenzimidazole (PA-PBI) or a composite inorganic-organic proton-conducting membranes which operate at high temperature (up to 200° C.) and which have no need for hydration for proton conduction and are tolerant to CO for thousands of hours.

In some embodiments, the composite inorganic-organic polymer membranes includes organic and inorganic phases that are both "dry" proton conductors. The composite proton-conducting membrane (PEM) may comprise an inorganic polymer and an organic polymer. In some embodiments, the PEM operates from room temperature to about 200° C. One advantage of the invention is that the PEM will not lose phosphate when exposed to water.

The organic polymer may be based on quaternary ammonium (QA)-biphosphate ion-pair-coordinated polyphenylene (PA-dopedQAPOH). The inorganic polymer is based on a ceramic, inorganic polymer 10 mol % indium 90% tin phosphate ($In_{0.1}Sn_{0.9}P_2O_7$ or ITP for short).

In some embodiments, the composite PEM comprises 70 to 90% a polymer (e.g., ITP) whose pores are filled with 30 to 10% of an organic polymer (e.g., PA-dopedQAPOH). In further embodiments, the inorganic polymer and organic polymer is a homogenous blend.

In some embodiments, the organic-inorganic composite membrane, comprises:
1) an organic proton conductor (e.g., derived from polyvinyl pyridinium phosphate (PVPP)); and
2) an inorganic proton conductor (e.g., derived from indium tin phosphate (ITP) such as ceramic ITP).

In some embodiments, the organic-inorganic composite membrane conducts only protons with no electroosmotic drag of molecular species, like water, and operating from room temperature and improve, as predicted by the Arrhenius equation, up to 150° C. and higher. Therefore, there is no need for hydration and no degradation of membrane properties (e.g., from leaching of ions) for RH up to 50%.

In further embodiments, the inorganic-organic composite comprises a ratio of inorganic component and organic component of no more than 90 wt. % inorganic and no less than 10 wt. % organic component. In further embodiments, the ratio is about 70% inorganic component and about 30% organic component. In further embodiments, the ratio is about 65-75% inorganic component and about 35-25% organic component. In further embodiments, the ratio is about 60% inorganic component and about 40% organic component. In further embodiments, the ratio is about 75 to about 90 wt. % of inorganic component and the organic polymer is between about 25 to about 10 wt. %. The wt. % of the inorganic and organic components disclosed herein is based on the mass of the membrane.

Another aspect of the invention encompasses a high temperature (e.g., able to operate at about 100 to about 150° C.) inorganic and organic proton conducting composite membrane.

In some embodiments, the membrane composite comprises a polymer comprising phosphated ammonium pendant groups that give proton conductivity. In further embodiments, the composite membrane comprises a polyphosphazene. In further embodiments, the composite membrane comprises a poly-phenylene backbone.

As used herein, the term "organic polymer" as used herein refers to an organic polymer that is a proton conductor e.g., an organic polymer made from polyvinyl pyridinium phosphate (PVPP).

As used herein, the term "inorganic polymer" as used herein refers to an inorganic polymer that is a proton conductor (e.g., an inorganic polymer made from indium tin phosphate or ITP).

The term "organic component" is used interchangeably with organic polymer herein.

The term "inorganic component" is used interchangeably with inorganic polymer herein.

Proton Conducting Membrane (PEM)

One aspect of the invention is a novel composite proton-conducting membrane comprising with organic and inorganic phases in which both are "dry" proton conductors, that is, each phase conducts proton with no added solvent, like water. Another novel aspect of the invention encompasses a composite proton-conducting membrane comprising an inorganic polymer and organic polymer, wherein both the inorganic polymer and an organic polymer, can individually operate from room temperature to about 220° C. with no water; and/or do not chemically or physically decompose; and/or lose proton-conductivity when exposed to water.

An exemplary embodiment of inorganic phase: When the protic salt is liquid it is known as a protic ionic liquid (pIL) where a pIL forms when 1 molecule of phosphoric acid is mixed with 1 molecule of pyridine; when the protic salt is a pendant group containing a base (or acid) covalently attached to a polymer strand and reacted with an acid (or base) and formed into a solid membrane, it is called a protic salt membrane, where an example of a protic salt membrane is poly vinyl 4 pyridine reacted with phosphoric acid forming poly vinyl pyridinium phosphate (PVPP) and when the protic salt has inorganic components reacted to form a ceramic doped with proton, it is called a plastic crystal, where an example of a plastic crystal is a ceramic, inorganic polymer made of 10 mol % indium (III) and 90% tin (IV) pyrophosphate which is charged −4 (which gives $In_{0.1}Sn_{0.9}P_2O_7$, or ITP for short) with the unsatisfied positive charge being in ITP being satisfied by 0.1 proton (H+) which imparts proton conductivity to this plastic solid. The composite discussed here is a composite which may contain a mixture of mostly an inorganic proton conducting plastic crystal enough organic salt membrane to fill all voids not filled by the plastic crystal to make a solid proton-conducting composite membrane.

The term "organic component" or "organic polymer" as used herein includes any polymer with covalently attached base (or acid) reacted with an acid (or base) to form a protic salt where the protic salt is stabilized by the stabilization energy of salt formation.

A preferred embodiment of the organic polymer would have strong enough interaction between the covalently attached base with acid so the acid does not get leached out by liquid water. A preferred organic polymer is e.g., quaternary ammonium (QA)-biphosphate ion-pair-coordinated polyphenylene (PA-dopedQAPOH).

In some embodiments of the inorganic component is a plastic crystal polymer such as a ceramic, whose formula is 10 mol % indium 90% tin phosphate ($In_{0.1}Sn_{0.9}P_2O_7$ or ITP for short). This ITP plastic crystal may be made from a mass of indium oxide, 0.5027 g, tin oxide, 4.8933 g and aqueous phosphoric acid (85 wt %) 12.1685 g reagents were mixed by hand in a ceramic crucible with a stirring rod at 300 deg C. for approximately 1 hr to form a ceramic "dope". This dope was then calcined in the crucible (uncovered) at 650 deg C. for 2.5 hrs.

In some embodiments, the composite PEM is a mixture of 70 to 90% of an inorganic polymer (e.g., ITP) whose pores are filled with 30 to 10% of an organic polymer (e.g., PA-dopedQAPOH). In some embodiments, the inorganic polymer and the organic polymer are present as a homogenous blend in the PEM. In further embodiments, the PEM comprises a homogenous blend of organic polymer (e.g., PA-dopedQAPOH) and inorganic polymer (e.g., ITP).

Another aspect of the invention encompasses a high temperature composite PEM comprised of 90% ITP-10% PVPP, wherein said ITP and said PVPP is optionally a homogenous blend. The high temperature composite PEM may have a conductivity on the order of about 0.1 S/cm at about 120° C. with no hydration and ambient pressure. In some embodiments, the composite PEM has properties as shown in FIG. 1.

One aspect of the invention encompasses a composite proton-conducting membrane (PEM) comprises an organic phase and an inorganic phase, wherein the organic and inorganic phases are both "dry" proton conductors. The composite proton-conducting membrane comprises an inorganic polymer and an organic polymer. In some embodiments, the PEM operates from room temperature to about 220° C. One advantage of the invention is that the PEM will not lose phosphate when exposed to water. The organic phase comprises an organic polymer, as defined herein. Further, the inorganic phase comprises an inorganic polymer, as defined herein.

The organic polymer may be based on quaternary ammonium (QA)-biphosphate ion-pair-coordinated polyphenylene (PA-dopedQAPOH). The inorganic polymer may be based on a ceramic, inorganic polymer comprising 10 mol % indium 90% tin phosphate ($In_{0.1}Sn_{0.9}P_2O_7$ or ITP for short).

In some embodiments, the composite PEM comprises 70 to 90% of an polymer (e.g., ITP) whose pores are filled with 30 to 10% of an organic polymer (e.g., PA-dopedQAPOH). In some embodiments, the inorganic polymer and organic polymer is a homogenous blend.

Another aspect of the invention encompasses an inorganic-organic composite membrane, wherein said membrane comprises:
1) an organic proton conductor (e.g., derived from polyvinyl pyridinium phosphate (PVPP)); and
2) an inorganic proton conductor (e.g., derived from indium tin phosphate (ITP) such as ceramic ITP).

In some embodiments, the inorganic-organic composite membrane conducts only protons with no electroosmotic drag of molecular species, like water, and operating from room temperature and improve, as predicted by the Arrhenius equation, up to 150° C. and higher. Therefore, there is no need for hydration and no degradation of membrane properties (e.g., from leaching of ions) for RH up to 50%.

In some embodiments, the inorganic-organic composite membrane comprises a ratio of inorganic component and organic component of no more than 90 wt. % inorganic and no less than 10 wt. % organic component. In further embodiments, the ratio is about 70% inorganic component and about 30% organic component. In further embodiments, the ratio is about 65-75% inorganic component and about 35-25% organic component. In further embodiments, the ratio is about 60% inorganic component and about 40% organic component. In further embodiments, the ratio is about 75 to about 90 wt. % of inorganic component and the organic polymer is between about 25 to about 10 wt. %. The wt. % of the inorganic and organic components disclosed herein is based on the mass of the composite membrane.

Another aspect of the invention encompasses a high temperature (e.g., able to operate at about 100 to about 150° C.) inorganic and organic proton conducting composite membrane.

In some embodiments, the composite membrane comprises a polymer comprising one or more phosphated ammonium pendant groups that give proton conductivity. In further embodiments, the composite membrane comprises a polymer comprising one or more poly-phosphazene groups. In further embodiments, the composite membrane comprises a polymer comprising a poly-phenylene backbone.

Preparation of PEM

Another aspect of the invention encompasses a method of preparing a composite PEM comprising blending:
1) an organic proton conductor and
2) an inorganic conductor.

A further aspect of the invention encompasses a method of preparing a composite PEM comprising blending an organic proton conductor made from polyvinyl pyridinium phosphate (PVPP) and an inorganic proton conductor (indium tin phosphate or ITP).

In some embodiments, the PEM of the present invention encompasses a composite membrane that is impermeable to molecular hydrogen ($H_2$). In further embodiments, the membrane is mounted on a high-strength porous current-collecting support at the anode. This support may be used to prevent the membrane rupturing the anode from the high hydrogen gas pressures being formed on the cathode.

Another aspect of the invention encompasses a composite proton-conducting membrane comprising an inorganic polymer and an organic polymer. In some embodiments, the composite membrane operates at 180° C. The composite membrane may be operated from below water freezing (sub 0° C.) in a low power "start-up" or "crawl mode" to as high as about 220° C. during high temperature excursion for up to about an hour.

In some embodiments, the composite membrane does not lose phosphate when exposed to water.

In some embodiments, the inorganic polymer comprises a ceramic form of pyrophosphate anion, which is charged −4, with tin (IV) and trivalent cations like indium (III) such as 0.1 indium 0.9 tin 1 pyro phosphate) or ITP), and other forms of tin (IV) pyrophosphate (-IV)(TP) with trivalent ions, like indium (III), aluminum (III), etc. In some embodiments, the inorganic polymer comprises a ceramic, inorganic polymer 10 mol % indium 90% tin phosphate ($In_{0.1}Sn_{0.9}P_2O_7$). Further, the inorganic polymer may be a ceramic form of pyrophosphate anion. The inorganic polymer may also be a ceramic form of pyrophosphate anion, which is charged −4, reacted mostly with tin (IV) and doped with a minority of trivalent cations like indium (III), to give an inorganic polymer, such as, 0.1 indium 0.9 tin 1 pyrophosphate (or ITP). Further, the inorganic polymer may be derived from any form of tin (IV) pyrophosphate (-IV) (TP) substituted with trivalent ions, like indium (III), aluminum (III), etc.

In some embodiments, the organic polymer comprises polyphenylene having amine phosphate moieties. These amine phosphate moieties may be contained by reacting polyphenylene having pendant organic bases like quaternary amines, pyridine, etc. with phosphoric acid to make an amine phosphate complex with intermolecular interaction energy on the order of 150 kcal mol). In further embodiments, the organic polymer comprises quaternary ammonium (QA)-biphosphate ion-pair-coordinated polyphenylene (PA-dopedQAPOH).

In some embodiments, the composite proton-conducting membrane comprises a homogeneous blend of 70 to 90 wt % an inorganic polymer and 30 to 10% organic polymer.

Some aspects of the invention encompasses a composite proton-conducting membrane comprising:
a homogeneous blend of 70 to 90 wt % an inorganic polymer such as, 10 mol % indium 90% tin phosphate ($In_{0.1}Sn_{0.9}P_2O_7$); and
30 to 10% an organic polymer such as quaternary ammonium (QA)-biphosphate ion-pair-coordinated polyphenylene.

Bipolar Plate

Another aspect of the invention pertains to a bipolar plate, wherein said bipolar plate comprises a liquid cooling chamber and gas flow channels, which is optionally laminated with a thin layer of conductive layer of inert metal.

The inventors found using a thin layer (e.g., 50 nm) of conductive layer of inert metal, like gold, over the Ni-alloy surface adds virtually no extra material cost to the bipolar plate but preserves the electronic conductivity and improves the corrosion resistance of this metallic BPP.

Although corrosion can occur in pinholes in the gold layer on the Ni-alloy surface, a passive layer forms on the exposed Ni-alloy surface in the pinhole, so corrosion does not undercut the conductive surface coating. The corrosion is limited to the small area of the pin hole. Corrosion in the pinholes has practically no effect on the electronic conductance of the bipolar plate. Even in corrosive environments and with pinholes, the gold coated C276 bipolar plate retains its desired high conductance, which preserves the high power density and high chemical to electrical conversion efficiency of the fuel cell. Stable single fuel cell operation and small stack (up to 10 cells) operations have been found when using a BASF MEA (2 porous Pt electrodes sandwiching a phosphoric acid loaded polybenzimidazole membrane) housed in the gold coated C276 bipolar plates and run at 150° C. for hundreds of hours. The fuel cells with the BASF MEA are typically 50% efficient, so the limit on stack size has been the heating inside of the stack, which requires cooling to remove waste heat.

Waste heat may be removed in at least 2 ways: 1) active or passive cooling plates placed between the bipolar plates or 2) by active cooling in each bipolar plate itself. A passive cooling plate is a sheet of electronically and thermally conductive material periodically placed between several cells. The area of the passive cooling plate is great than the cell area, so it extends outside the cells, so an air fan can remove heat from the edge of the passive cooling plate, so heat flows out from the interior of the stack. Active cooling plates are periodically placed between several cells and use a circulating fluid to remove heat from the interior of the stack. The hot fluid is sent to a radiator which rejects heat to the ambient air thereby cooling the fluid which can then be sent back to the cooling plate in the stack to remove more heat.

Passive cooling plates made of copper and whose periphery is cooled by an air fan to remove heat from the stack which allows the number of cells in a stack with metal bipolar plates to be increased from 10 cells to 30 cells may be used. For 30 cell, each of cell area of 250 cm² with 6 copper plates of area of 300 cm², the stack steadily generates 1 kilowatt with a fan blowing the periphery of the cooling plates. Passive cooling is bulky because the copper cooling plates extend beyond the cell area and a path around the stack for air cooling by a fan is needed. To reduce bulk, active cooling is preferred.

Compact active cooling may be obtained by laminating metal bipolar plates to form a cooling chamber inside each bipolar plate as shown in the figure.

Active cooling will allow the stack power to go beyond 1 kW to many kilowatts in a compact fuel cell stack.

In a further embodiment, the bipolar plate comprises a liquid cooling chamber and gas flow channels, optionally with comprises a thin layer of conductive material. In some embodiments, the bipolar plate comprises a thin layer of conductive material with a thickness of about 50 nm.

Another aspect of the invention encompasses a bipolar plate according to FIG. 1. In some embodiments, the bipolar plate of FIG. 1 is laminated with a thin layer of conductive material. In some embodiments, the bipolar plate comprises a thin layer of conductive material with a thickness of about 50 nm or less. In some embodiments, the bipolar plate comprises a thin layer of conductive material with a thickness of about 15 nm or less.

In some embodiments, the BPP comprises a thin layer (e.g., about 50 nanometer) of conductive materials, such as electroplated gold over metal plate. In further embodiments, instead of electroplated gold, the thin layer may be a thin layer of high temperature epoxy filled with a thermal and electronic conductor like gold or any inert metal or conducting graphite, like nanotubes or graphene. In further embodiments, the layer may be configured to form a monolayer over the Ni-alloy surface with a minimum of pinholes, so the uncovered area is 0% but at least less than 10% of the surface area of the bipolar plate. This condition is satisfied when the Au layer is about 50 nm thick.

In some embodiments, the bipolar plate may comprise one or more corrosion resistant metals, such as a chromium alloy, metallic Ni-alloy (e.g., HASTELLOY® C-276 alloy, HASTELLOY® C-22® alloy, or HAYNES® 230® alloy), stainless steel with chromium such as SS343 or SS304, or any alloy that passivates in air and acid environments.

In some embodiments, the BPP is corrosion resistant.

In some embodiments, the BPP comprises a laminated cooling channel.

In some embodiments, the BPP feeds fuel and collect electrons from fuel cells.

Another aspect of the invention encompasses a method of feeding fuel comprising contacting the fuel with one or more bipolar plates of the invention.

Another aspect of the invention encompasses a method of preparing a bipolar plate comprising stamping a sheet of factory metal into shape as is shown e.g., FIG. 1. In some embodiments, a BPP may be prepared by stamping together sheets of metal (that may be corrosive resistant and/or laminated) and braising together the metals to form one or more cooling channels.

In some embodiments, each side of the BPP flows a different gas, e.g., one side hydrogen, the other side flows oxygen and the middle channel flows coolant.

Another aspect of the invention encompasses a method of preparing a bipolar plate comprising stamping a sheet of factory corrosive resistant metal into shape as is shown e.g., FIG. 1.

Another aspect of the invention encompasses a method of preparing a bipolar plate comprising stamping a sheet of factory annealed Ni-alloy into shape as is shown e.g., FIG. 1.

Another aspect of the invention encompasses a passive bipolar plate. For a passive bipolar plate, the BPP may be plated with a thin layer of conductive materials. In further embodiments, the BPP may be plated with a thin layer of conductive metals. In further embodiments, the BPP may be plated with a thin layer of conductive material with a thickness of about 50 nm. In further embodiments, the BPP may be plated with a thin layer of conductive metal with a thickness of about 50 nm. In further embodiments, the BPP may be plated with a thin layer of gold. In further embodiments, the BPP may be plated with a thin layer of gold with a thickness of about 50 nm.

Another aspect of the invention encompasses an active cooling BPP. The active cooling BPP may be prepared by brazing two plates are together, e.g., as shown in FIG. 1, and the gas sides are metal-plated with, for example, gold.

Another aspect of the invention encompasses a passive cooled fuel stack comprising a bipolar plate of the invention with one or more MEAs. The passive cooling plates may be made of copper and whose periphery may be cooled by an air fan to remove heat from the stack. This passive cooling allows the number of cells in a stack with metal bipolar plates to be increased from 10 cells to 30 cells.

In some embodiments, for 30 cells, each of cell area of 250 $cm^2$, the passive cooling uses 6 copper plates of area of 300 $cm^2$ whose periphery is cooled by an air fan.

Another aspect of the invention is an active cooled fuel stack comprising the bipolar plate of the invention and either one of two active cooling strategies 1) periodic use of active cooling plates or 2) an integrated cooling chamber in each and every bipolar plate, e.g., as is shown FIG. 1.

For strategy 1, external active cooling plates may be periodically placed between several cells with a heat transfer fluid circulating in the active cooling plate to remove heat from the interior of the stack. Then the hot heat transfer fluid is sent to a radiator, to rejects heat from the fluid to the ambient air, thereby cooling the fluid, so it can then be sent back to the cooling plate in the stack to remove more heat.

For strategy 2, compact active cooling may be obtained by laminating metal bipolar plates to form a cooling chamber inside each bipolar plate as shown in the figure. A heat transfer fluid is circulating through the liquid cooling chamber in the bipolar plate to remove heat from the interior of the stack. Then the hot heat transfer fluid is sent to a radiator, to rejects heat from the fluid to the ambient air, thereby cooling the fluid, so it can then be sent back to the liquid cooling chamber in the bipolar plate in the stack to remove more heat.

Another aspect of the invention encompasses a method of cooling or heating MEAs comprising strategy 2 above in which the interior of the liquid cooling chamber in the bipolar plates, e.g., as shown in the FIG. 1, comprising contacting a liquid heat transfer fluid, such as silicon oil or any fluid that is a stable liquid at appropriate temperatures, preferably up to 250° C., with a BPP of the invention.

The term "bipolar plate" is used interchangeably with the terms "BPP" and "plate".

The bipolar plate (BPP) as described herein feeds fuel to and collects electronic current from an electrode in a fuel cell. Typically, two bipolar plates surround each membrane electrode assembly (MEA) to form a complete cell where an MEA is a membrane laminated to a cathode and anode. When the cells are connected in a series, they form a fuel cell stack and the total stack voltage is the sum of the cell voltages.

Bipolar plates are a key component of proton exchange membrane (PEM) fuel cells with multifunctional character. They uniformly distribute fuel gas and air, conduct electrical current from cell to cell, remove heat from the active area, and prevent leakage of gases and coolant.

PEM fuel cells are of prime interest in transportation applications due to their relatively high efficiency and low pollutant emissions. Bipolar plates are the key components of these devices as they account for significant fractions of their weight and cost.

Traditionally, the PEM fuel cell stack hardware consists of the Membrane Electrode Assembly (MEA), the bipolar plate, seal, and end plate, etc. (see Figure FIG. 2).

Among the components, the bipolar plate is considered to be one of the most costly and problematic of the fuel cell stack. In addition to meeting cost constraints, the bipolar plates must possess a host of other properties. To that end, a bipolar plate must satisfy the following characteristics:
- chemical resistance to humid oxidative and reductive conditions
- gas tightness
- high conductivity
- low contact resistances
- dimensional stability
- low costs in terms of material and fabrication
- no design restrictions
- high stability under mechanical loads
- corrosion resistance
- low weight.

The search for suitable, low-cost bipolar plate materials becomes a key element of PEMFC stack development. Since BPs significantly contribute to the volume, weight and cost of PEM fuel cell stacks, historically there have been robust efforts worldwide to find suitable materials for BPs. The materials include non-porous graphite, coated metallic sheets, polymer composites, etc.

The bipolar plates that feed fuel and collect electrons from fuel cells are one of the largest heaviest and most expensive components of a fuel cell stack.

Therefore, the choice of materials for construction of the plates is of crucial importance.

Fuel cell stacks are lower in weight, volume and cost when stampable corrosion resistant metal BPPs replace conventional milled or compression-molded graphite bipolar plates. Fuel cell stacks using corrosion resistant metal bipolar plates and high temperature membrane electrodes assemblies (MEAs) can provide kilowatts of power inside airplanes and for scooters, automobiles, load levelers, communication stations and residential power in remote places.

In fact, using metal instead of graphite BPPs can lower cost from $100 to $1 per BPP, and lower weight and volume which leads to higher specific and volumetric power densities, as shown in the table below.

|  | Metallic | Graphite |
| --- | --- | --- |
| Specific Power (Watts/kg) | 365 | 169 |
| Power Density (Watts/liter) | 691 | 396 |

Metallic materials have advantages over graphite-based ones because of their higher mechanical strength and better electrical conductivity. However, corrosion resistance is a major concern that remains to be solved as metals may develop oxide layers that increase electrical resistivity, thus lowering the fuel cell efficiency.

As bipolar plates are critical functional elements of PEM fuel cell stacks, which make a considerable contribution to the costs and the weight of the stack, there is great demand for bipolar plates which meet the abovementioned requirement profile and avoid the drawbacks of the known bipolar plates. Therefore, there is a need for uncomplicated and cost-effective fabrication of bipolar plates to be feasible.

The inventors surprisingly found that fuel cell stacks can benefit if corrosion resistant metal replace conventional graphite plates. The inventors also surprisingly found that using corrosion resistant metal bipolar plates in fuel stack is advantageous. One aspect of the invention encompasses a bipolar plate comprising a liquid cooling chamber and gas flow channels, which is optionally laminated with a thin layer of conductive layer of inert metal.

In some embodiments, the BPP is a gold coated C276 bipolar plate. Another aspect of the invention encompasses a BPP comprising a Ni-alloy surface, with optionally a thin layer of gold.

The inventors also found that using a thin (e.g., 50 nm) conductive layer of inert metal, like gold, over a bipolar metal plate surface (e.g., a bipolar metal plate comprising a Ni-alloy surface) adds virtually no extra material cost to the bipolar plate. This is advantageous because it at least preserves the electronic conductivity and improves the corrosion resistance of this metallic BPP.

The inventors also surprisingly discovered the corrosive resistance of the bipolar plates of the invention is novel. This is exemplified as follows (using a Ni-alloy bipolar plate with a gold layer, as the inert conductive layer): In particular, although corrosion can occur in pinholes in the gold layer on the Ni-alloy surface, a passive layer forms on the exposed Ni-alloy surface in the pinhole, so corrosion does not undercut the conductive surface coating. The corrosion is limited to the small area of the pinhole. Corrosion in the pinholes of the BPP has practically no effect insofar as performance of the BPP. Notably, corrosion in the pinholes has practically no effect on the electronic conductance of the bipolar plate. For example, even in corrosive environments and with pinholes, a gold coated C276 bipolar plate retains its desired high conductance, which preserves the high power density and high chemical to electrical conversion efficiency of the fuel cell. Stable single fuel cell operation and small stack (up to 10 cells) operations have been found when using a BASF MEA (2 porous Pt electrodes sandwiching a phosphoric acid loaded polybenzimidazole membrane) housed in the gold coated C276 bipolar plates and run at 150° C. for hundreds of hours. The fuel cells with the BASF MEA are typically 50% efficient, so the limit on stack size has been the heating inside of the stack, which requires cooling to remove waste heat.

One challenge of BPP is ensuring that the plates do not overheat. One aspect of the invention encompasses removing waste (i.e., cooling the BPP(s)). Waste heat may be removed in at least 2 ways: 1) active or passive cooling plates placed between the bipolar plates or 2) by active cooling in each bipolar plate itself. In some embodiments, a passive cooling plate is a sheet of electronically and thermally conductive material periodically placed between several cells. The area of the passive cooling plate is great than the cell area, so it extends outside the cells, so an air fan can remove heat from the edge of the passive cooling plate, so heat flows out from the interior of the stack. In further embodiments, active cooling plates are periodically placed between several cells and use a circulating fluid to remove heat from the interior of the stack. The hot fluid is sent to a radiator which rejects heat to the ambient air thereby cooling the fluid which can then be sent back to the cooling plate in the stack to remove more heat.

One aspect of the invention encompasses one or more passive cooling plates made of metal (e.g., copper) and whose periphery may be cooled e.g., by an air fan to remove heat from the stack which allows the number of cells in a stack with metal bipolar plates to be increased from 10 cells to 30 cells may be used. For example, for a 30-cell configuration, each of cell area of 250 cm$^2$ with 6 metal (e.g., copper) plates of area of 300 cm$^2$, the stack steadily generates 1 kilowatt with a fan blowing the periphery of the cooling plates. Traditionally, passive cooling is bulky because the metal (e.g., copper) cooling plates extend beyond the cell area and a path around the stack for air cooling by a fan is needed. To reduce bulk, active cooling is preferred.

Compact active cooling may be obtained by laminating metal bipolar plates to form a cooling chamber inside each bipolar plate as shown in the figure.

Active cooling will allow the stack power to go beyond 1 kW to many kilowatts in a compact fuel cell stack.

One aspect of the invention encompasses a bipolar plate comprising a liquid cooling chamber and gas flow channels, optionally with comprises a thin layer of conductive material. In some embodiments, the bipolar plate comprises a thin layer of conductive material.

Another aspect of the invention encompasses a bipolar plate according to FIG. 1. In some embodiments, the bipolar plate of FIG. 1 is laminated with a thin layer of conductive material.

One aspect of the invention encompasses a BPP comprising a thin layer of one or more conductive materials. The conductive materials cover at least a part of the surface of the BPP. The conductive materials may cover the entire surface of the BPP. The term "thin layer" as used herein to refer to the thickness of the conductive material that may be used to coat a part of (or the entire surface) of the BPP includes a thickness of at least about 1 nm.

In some embodiments, the term "thin layer" as used herein refers at least a monolayer of conductive material (e.g., metal).

In some embodiments, the term "thin layer" refers to a monolayer of conductive material.

In some embodiments, the term "thin layer" refers to a monolayer of conductive metal (e.g., gold).

In some embodiments, the term "thin layer" refers to a thickness of about 2 microns or less.

In some embodiments, the term "thin layer" refers to a thickness of about 50 microns or less.

In some embodiments, the term "thin layer" refers to a thickness of about 40 microns or less.

In some embodiments, the term "thin layer" refers to a thickness of about 30 microns or less.

In some embodiments, the term "thin layer" refers to a thickness of about 20 microns or less.

In some embodiments, the term "thin layer" refers to a thickness of about 10 microns or less.

In some embodiments, the term "thin layer" refers to a thickness of about 5 microns or less.

In some embodiments, the term "thin layer" refers to a thickness of about 1 microns or less In some embodiments, the term "thin layer" refers to a thickness of about 1 microns to about 1 nanometer.

In some embodiments, the term "thin layer" refers to a thickness of about 2 microns to about 1 nanometer.

In some embodiments, the term "thin layer" refers to a thickness of about 5 microns to about 1 nanometer.

In some embodiments, the term "thin layer" refers to a thickness of about 10 microns to about 1 nanometer.

In some embodiments, the term "thin layer" refers to a thickness of about 20 microns to about 1 nanometer.

In some embodiments, the term "thin layer" refers to a thickness of about 50 microns to about 1 nanometer.

In some embodiments, the term "thin layer" refers to a thickness of about 500 nanometer to about 1 nanometer.

In some embodiments, the term "thin layer" refers to a thickness of about 300 nanometer to about 1 nanometer.

In some embodiments, the term "thin layer" refers to a thickness of about 100 nanometer to about 1 nanometer.

In some embodiments, the term "thin layer" refers to a thickness of about 50 nanometer to about 1 nanometer.

In some embodiments, the term "thin layer" refers to a thickness of about 20 nanometer to about 1 nanometer.

In some embodiments, the term "thin layer" refers to a thickness of about 30 nanometer to about 1 nanometer.

In some embodiments, the term "thin layer" refers to a thickness of about 10 nanometer to about 1 nanometer.

In some embodiments, the term "thin layer" refers to a thickness of about 5 nanometer to about 1 nanometer.

In some embodiments, the term "thin layer" refers to a thickness of about 1 nanometer.

In some embodiments, the term "thin layer" refers to a thickness of about 2 nanometer.

In some embodiments, the term "thin layer" refers to a thickness of 5 nanometer.

In some embodiments, the term "thin layer" refers to a thickness of 10 nanometer.

In some embodiments, the term "thin layer" refers to a thickness of about 15 nm.

In some embodiments, the term "thin layer" refers to a thickness of 20 nanometer.

In some embodiments, the term "thin layer" refers to a thickness of 30 nanometer.

In some embodiments, the term "thin layer" refers to a thickness of 40 nanometer.

In some embodiments, the term "thin layer" refers to a thickness of about 50 nm.

In some embodiments, the term "thin layer" refers to a thickness of 60 nanometer.

In some embodiments, the term "thin layer" refers to a thickness of 75 nanometer.

In some embodiments, the BPP comprises a thin layer (of conductive materials, such as electroplated gold over metal plate. In further embodiments, instead of electroplated gold, the thin layer may be a thin layer of high temperature epoxy filled with a thermal and electronic conductor like gold or any inert metal or conducting graphite, like nanotubes or graphene. In further embodiments, the layer may be configured to form a monolayer over the Ni-alloy surface with a minimum of pinholes, so the uncovered area is 0% but at least less than 10% of the surface area of the bipolar plate. In further embodiments, the BPP comprises a gold layer with a thickness of about 50 nm.

In some embodiments, the bipolar plate may comprise one or more corrosion resistant metals, such as a chromium alloy, metallic Ni-alloy (e.g., HASTELLOY® C-276 alloy, HASTELLOY® C-22R alloy, or HAYNES® 230® alloy), stainless steel with chromium such as SS343 or SS304, or any alloy that passivates in air and acid environments.

In some embodiments, the BPP is corrosion resistant.

In some embodiments, the BPP comprises a laminated cooling channel.

In some embodiments, the BPP feeds fuel and collect electrons from fuel cells.

Another aspect of the invention encompasses a method of feeding fuel comprising contacting the fuel with one or more bipolar plates of the invention.

Another aspect of the invention encompasses a method of preparing a bipolar plate comprising stamping a sheet of factory metal into shape as is shown e.g., FIG. 1. In some embodiments, a BPP may be prepared by stamping together sheets of metal (that may be corrosive resistant and/or laminated) and braising together the metals to form one or more cooling channels.

In some embodiments, each side of the BPP flows a different gas, e.g., one side hydrogen, the other side flows oxygen and the middle channel flows coolant.

Another aspect of the invention encompasses a method of preparing a bipolar plate comprising stamping a sheet of factory corrosive resistant metal into shape as is shown e.g., FIG. 1.

Another aspect of the invention encompasses a method of preparing a bipolar plate comprising stamping a sheet of factory annealed Ni-alloy into shape as is shown e.g., FIG. 1

Another aspect of the invention encompasses a passive bipolar plate. For a passive bipolar plate, the BPP may be plated with a thin layer of conductive materials. In further embodiments, the BPP may be plated with a thin layer of conductive metals. In further embodiments, the BPP may be plated with a thin layer of conductive material with a thickness of about 50 nm. In further embodiments, the BPP may be plated with a thin layer of conductive metal with a thickness of about 50 nm. In further embodiments, the BPP may be plated with a thin layer of gold. In further embodiments, the BPP may be plated with a thin layer of gold with a thickness of about 50 nm.

Another aspect of the invention encompasses an active cooling BPP. The active cooling BPP may be prepared by brazing two plates are together, e.g., as shown in FIG. 1, and the gas sides are metal-plated with, a conductive material, for example, gold.

Another aspect of the invention encompasses a passive cooled fuel stack comprising a bipolar plate of the invention with one or more MEAs. The passive cooling plates may be made of copper and whose periphery may be cooled by an air fan to remove heat from the stack. This passive cooling allows the number of cells in a stack with metal bipolar plates to be increased from 10 cells to 30 cells.

In some embodiments, for 30 cells, each of cell area of 250 cm$^2$, the passive cooling uses 6 copper plates of area of 300 cm$^2$ whose periphery is cooled by an air fan.

Another aspect of the invention is an active cooled fuel stack comprising the bipolar plate of the invention and either one of two active cooling strategies 1) periodic use of active cooling plates or 2) an integrated cooling chamber in each and every bipolar plate, e.g., as is shown FIG. 1.

For strategy 1, external active cooling plates may be periodically placed between several cells with a heat transfer fluid circulating in the active cooling plate to remove heat from the interior of the stack. Then the hot heat transfer fluid is sent to a radiator, to rejects heat from the fluid to the ambient air, thereby cooling the fluid, so it can then be sent back to the cooling plate in the stack to remove more heat.

For strategy 2, compact active cooling may be obtained by laminating metal bipolar plates to form a cooling chamber inside each bipolar plate as shown in the figure. A heat transfer fluid is circulating through the liquid cooling chamber in the bipolar plate to remove heat from the interior of the stack. Then the hot heat transfer fluid is sent to a radiator, to rejects heat from the fluid to the ambient air, thereby cooling the fluid, so it can then be sent back to the liquid cooling chamber in the bipolar plate in the stack to remove more heat.

Another aspect of the invention encompasses a method of cooling or heating MEAs comprising strategy 2 above in which the interior of the liquid cooling chamber in the bipolar plates, e.g., as shown in the FIG. 1, comprising contacting a liquid heat transfer fluid, such as silicon oil or any fluid that is a stable liquid at appropriate temperatures, preferably up to 250° C., with a BPP of the invention.

Integrated Reformer Reactor

Another aspect of the invention pertains to an integrated reformer reactor.

Hydrogen is an alternative fuel which is well recognized as one of the solutions to the fossil fuel depletion problem. As an energy carrier, hydrogen can be used to store and deliver energy or be converted into other types of energy, such as heat, electrical energy or mechanical work. Among all the applications, fuel cell is drawing increasing attention for its advantages such as higher theoretical energy conversion efficiency, no internal moving mechanical parts and environmentally friendly.

Almost all the common fuel cells require hydrogen gas as the fuel source oxidized to complete the half-reaction redox cycle, which makes hydrogen gas a crucial factor for the development of fuel cell technique. However, under some certain circumstances, hydrogen supply could be extremely constrained by the harsh environment. For example, fuel cells used onboard has critical requirement on the space and extremely limited energy source, which makes carrying extra hydrogen tanks not an option in most cases. Therefore, onboard hydrogen production via catalytic autothermal reforming (ATR) and water-gas shift (WGS) is considered beneficial to vehicles using fuel cells as auxiliary power unit because it eliminates the challenges of hydrogen storage and delivery.

Hydrogen has been considered for use as an alternative fuel due to its low-greenhouse gas emission, abundance in domestic sources, and crucial role in fuel cell systems. Basically, fuel cell is a device which converts chemical energy stored in a fuel into electrical energy. A typical fuel cell unit is primarily composed of an anode, a cathode and an electrolyte separating between them. In operation, fuel (mainly hydrogen or carbon monoxide) and an oxidant are fed to the anode and cathode respectively with the electrochemical reaction occurring on either electrode depending on the type of the fuel cell. The electrons produced by the anode reaction get to the cathode through the external circuit, which generates electric current. Since its first discovery in 19th century, fuel cell has been developed competitively in many applications such as stationary power plant, transportation, and household portable power sources. Due to the advantages of fast start-up, high reliability, and compactness, solid oxide fuel cell (SOFC) and proton exchange membrane fuel cell (PEMFC) were investigated to serve as the auxiliary power units (APUs) on board of vessels and vehicles with hydrogen as the primary fuel.

However, hydrogen does not exist naturally as a gas on the earth. It has to be produced from its sources which contains hydrogen as an element, such as water, hydrocarbon, ammonia and metal hydrides. The current dominant hydrogen production technique is natural gas steam reforming which produces 95% of hydrogen in the United States according to the Office of Energy Efficiency & Renewable Energy. This technique requires natural gas and water reacting together with very high energy input so that it is only promising in large central plants where continuous high-capacity energy source is available. Other state-of-the-art techniques include biomass steam reforming, electrolysis, gasification, thermochemical water splitting, photocatalytic, etc., which are still under research worldwide regarding either cost or reliability issues. Although in general the mature steam reforming and the other emerging techniques have the capability to satisfy the hydrogen demand for both industry and civilian, the option is limited when considering hydrogen production under some certain circumstances. For example, underwater exploration have critical requirement on the carry-on items and are exposed to extremely limited energy sources. Thus, to supply hydrogen to the onboard fuel cell system, it would be not practical to carry extra hydrogen or deploy any onsite hydrogen production techniques which require solar energy or very high energy input.

To solve this issue, the inventors focused their attention on another technique, namely autothermal reforming (ATR), to produce hydrogen from hydrocarbons (light or heavy) onboard so that there is no need to worry about hydrogen delivery and storage, which are still two primary challenges that a huge number of researchers are working on.

One aspect of the invention is a fuel processing system with reliable ATR and WGS catalysts to produce hydrogen feasibly from hydrocarbons such as Jet A fuel.

Autothermal reforming is a combination of two processes, partial oxidation (POX) and steam reforming (SR). POX is an exothermic process with relatively high reaction rate and low hydrogen production; however, SR is endothermic with high hydrogen production and requires high energy input. Autothermal reforming process takes benefit from both processes, such as rapid thermal response, relatively high hydrogen yields, and remarkable coke-suppression capability, making it the most feasible technique for onboard hydrogen production.

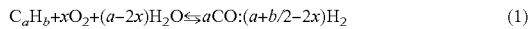

$$C_aH_b + xO_2 + (a-2x)H_2O \leftrightarrows aCO:(a+b/2-2x)H_2 \quad (1)$$

Equation (1) shows the typical expression of a hydrocarbon autothermal reforming reaction. It can be manipulated by selecting different xs (oxygen to fuel ratio) to make the reaction either POX dominant or SR dominant, in other words, either endothermic, exothermic or even thermally neutral. Therefore, the combined process could be controlled to be slightly exothermic or thermally neutral so that if the reaction exhaust heat could be utilized efficiently, it potentially requires no need for any external heating or cooling source to maintain the reaction status once the process starts. That being said, the process has a potential to be self-sustainable.

Historically, production of hydrogen via autothermal reforming of hydrocarbons is tedious and time consuming, in part, because the hydrocarbon, such as jet fuel contains sometimes hundreds of complicated organic substances. For example, autothermal reforming of Jet A fuel is traditionally problematic: 1) The Jet fuel is a kerosene type compound with hundreds of complicated organic substances from C8 to C16. The primary groups of hydrocarbons in Jet fuel are paraffins, aromatics, naphthenes and olefins. To enhance the fuel performance properties, additives such as antioxidant and metal deactivator are usually added into the Jet fuel as well, which further complicates the situation. 2) The sulfur concentration containing in the Jet fuel is typically over 1000 ppm. Sulfur is detrimental to most chemical catalysts including the ATR catalyst and the catalyst in the downstream fuel cells. It can deactivate the catalysts in a very short time and the deactivation process is usually irreversible. 3) Autothermal reforming usually ends up with a mixture of H2, CO, $CO_2$, H2O in the reformate. It can be directly passed to an SOFC since H2 and CO are both eligible fuel. Nevertheless, it would bring troubles if a PEMFC is placed downstream, as CO could significantly poison the anode catalyst. Although high temperature PEM (HT-PEM) fuel cells may have better CO-tolerance capability for as high as 4-5% at 200° C., effective CO removal techniques must be carried out before the reformate fueling to the fuel cell.

The inventors surprisingly found a technique and develop the requisite device(s) that addresses these obstacles.

Another aspect of the invention is directed to fuel processing unit comprising optionally an injection section, an ATR reactor, a WGS reactor, two countercurrent flow heat exchangers and mixing section. A further aspect of the invention encompasses a method comprising firstly passing, fuel (e.g., hydrocarbon), water and air through the two heat exchangers at the back part of the processor, wherein these species are preheated by the exhaust heat of the products, followed by injecting fuel through (e.g., through a nozzle mounted e.g., in the middle of the front cap), to generate a uniform mist to enhance the mixing. After mixing with water and air in the mixing zone, the reactants are directly conducted to the ATR reactor.

A further aspect of the invention encompasses autothermal reforming of hydrocarbon (e.g. Jet A fuel) followed by water-gas shift to produce hydrogen.

In some embodiments, the fuel processor is expected to be actuated a simple ignition system regardless of whether a warm start is available. The ignition system may be a heating coil, a spark plug, or even a piezoelectric device, which is able to generate sparks or high temperature with limited inputs. In this case, the mixing zone may be modified to accommodate for the gadget.

Fuel processor may be prepared using 3D printing. By printing the heat exchanger with certain number of tubes with the I.D. of 3-6 mm in a cross section, the reactor would be more compact, the heat transfer would be more efficient and temperature distribution would be more uniform.

One aspect of the invention encompasses a kWth-class fuel processor. The fuel processor may be used to produce maximum amount of hydrogen and minimize the carbon monoxide concentration from hydrocarbon (e.g., Jet-A fuel) so that it can be directly connected to the anode of a PEMFC. In some embodiments, autothermal reforming may be used to convert the jet fuel into syngas, followed by the water-gas shift reaction eliminating carbon monoxide. This was found to further increase the hydrogen yield. Because the overall reaction tends to be exothermic, there is a potential to make the entire process self-sustainable by taking full benefit of the waste heat. Furthermore, the method can be made to be self-sustaining by using the heat generated by the exothermic reaction ("waste heat").

In some embodiments, two countercurrent-flow heat exchangers (recuperators) are incorporated in the system with the first one sandwiched between ATR reformer and WGS reactor and the secondary recuperator placed in the back.

It is to be understood that both the foregoing general description of the invention and the following detailed description are exemplary, and thus do not restrict the scope of the invention.

One aspect of the invention compact unit comprising a hydrocarbon auto-thermal reformer (ATR), a water-gas shift (WGS) reactor, and two or more heat recuperators.

A further aspect of the invention compact unit comprising a hydrocarbon auto-thermal reformer (ATR), a water-gas shift (WGS) reactor, and two heat recuperators. The hydrocarbon auto-thermal reformer (ATR), the water-gas shift (WGS) reactor, and heat recuperators may be arranged as illustrated in FIG. 4.

In some embodiments, the hydrocarbon auto-thermal reformer (ATR) is located at the front of the unit.

In some embodiments, the heat recuperator comprises one or more stainless steel tubes or coils. In further embodiments, the stainless steel coil is ⅛ inch thick.

Another aspect of the invention encompasses a compact unit according to FIG. 4.

In some embodiments, the compact unit further comprises an injection section.

Figure 14:
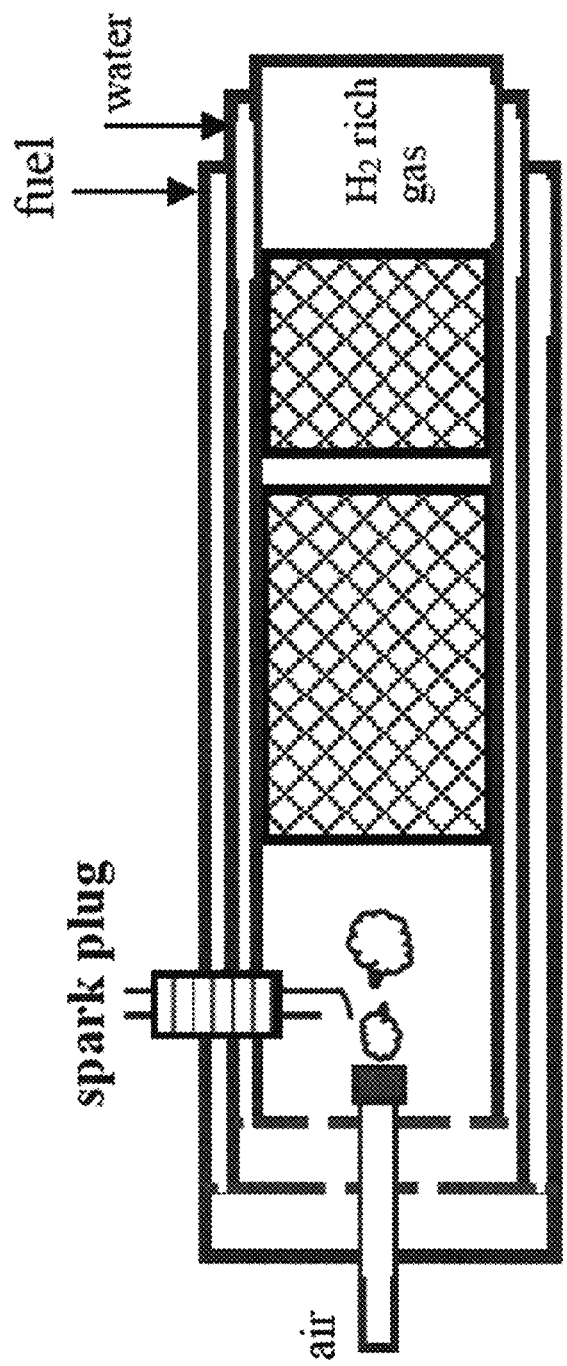
FIG. 14 Option for the heat recuperation. The heat recuperation to heat up water and air is accomplished through the annuli formed by the reactor tube, and other tubes. The structure becomes simpler and is good for the reduction of fabrication cost.

In some embodiments, the compact unit further comprises a spark plug, which is used for startup. The inventors surprisingly found that the reformer may be modified with the addition of an ignition spark plug for the startup. The spark plug may be arranged shown in FIGS. 7 and 14. The reaction in the reformer can be started with ignition, instead of external heating. This dramatically increases the convenience of operation and reduces the startup time. Once the reaction is started, heat from the products gases is recuperated to warm up the fresh fuel, air, and water, and sustain the reaction.

Figure 7:
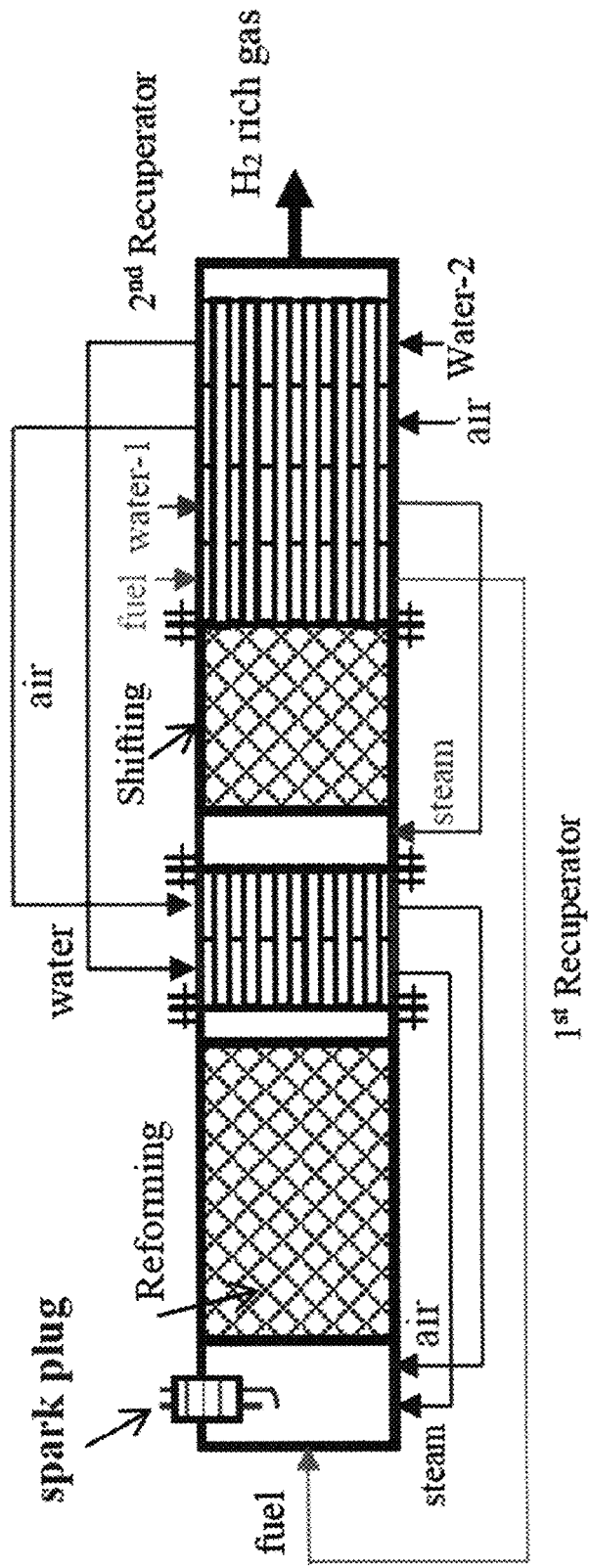
FIG. 7. An exemplary concept of integrated reformer and water-gas-shifting with addition of spark plug in the reactor. The reformer of FIG. 1 may be modified with the addition of an ignition spark plug for the startup. The reaction in the reformer can be started with ignition, instead of external heating. This dramatically increases the convenience of operation and reduces the startup time. Once the reaction is started, heat from the products gases is recuperated to warm up the fresh fuel, air, and water, and sustain the reaction.
Figure 8:
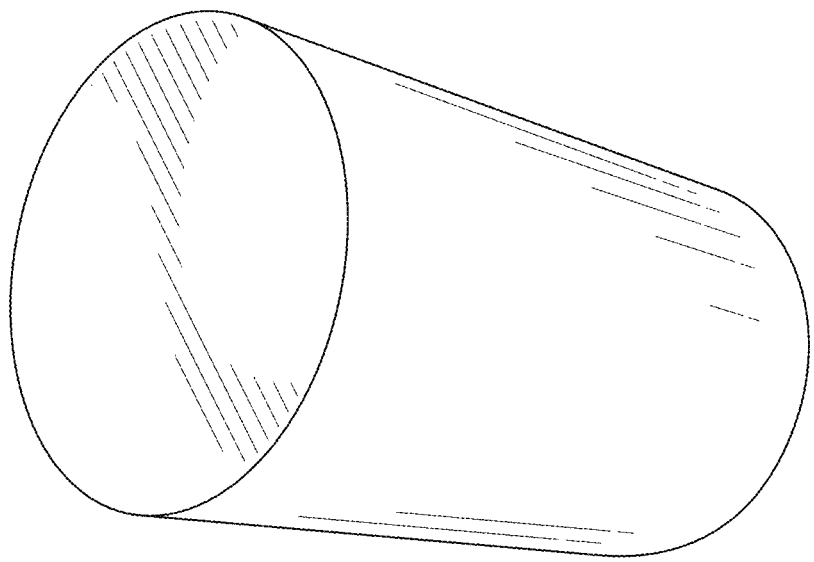
FIG. 8. Honeycomb catalytic reaction section
Figure 8:
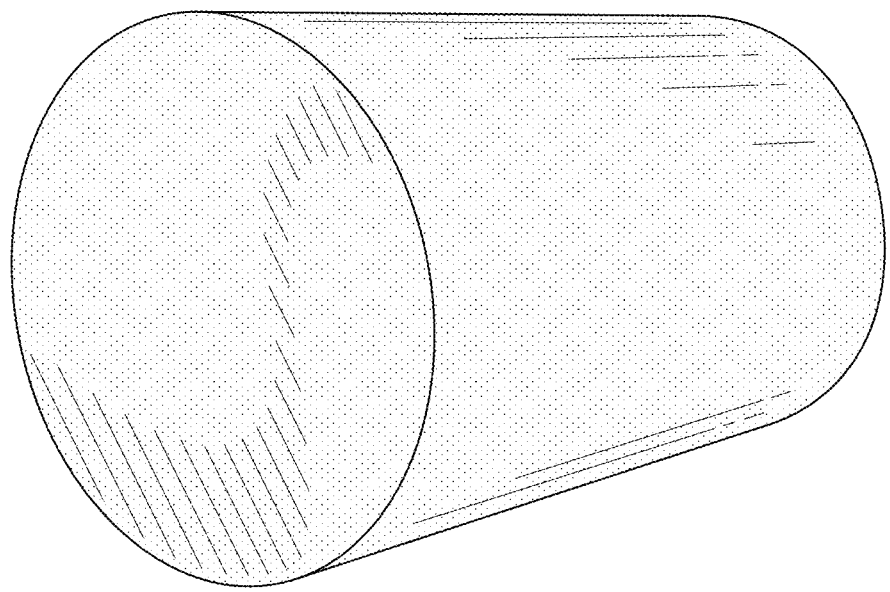
Figure 9:
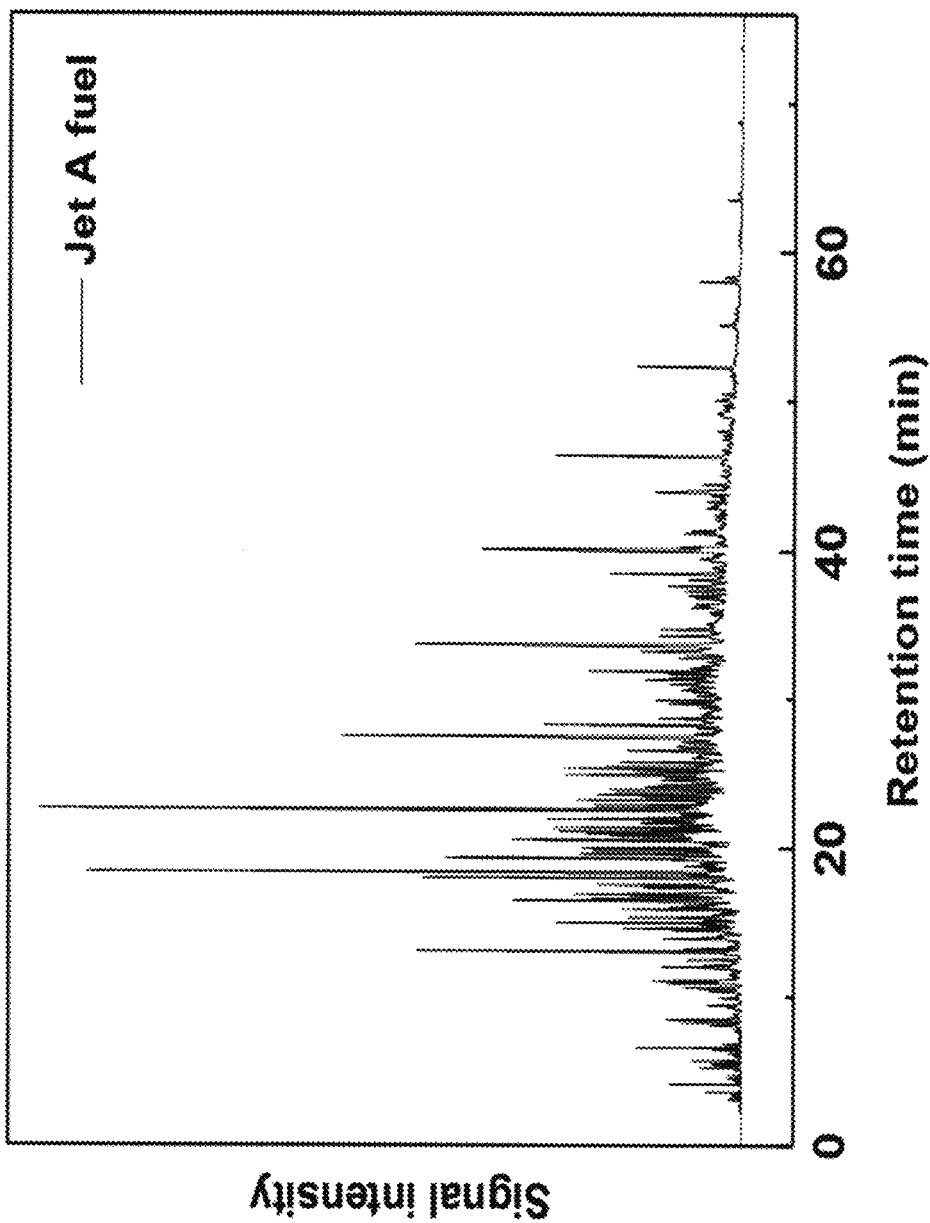
FIG. 9. Gas chromatography spectrum of Jet A fuel. Jet A fuel is a mixture of hundreds of hydrocarbons with the most groups of paraffin (including isoparaffins), cycloparaffins or naphthenes, aromatics and olefins. The carbon number distribution in a kerosene-type jet fuel is between about 8 and 16 carbon numbers.
Figure 10:
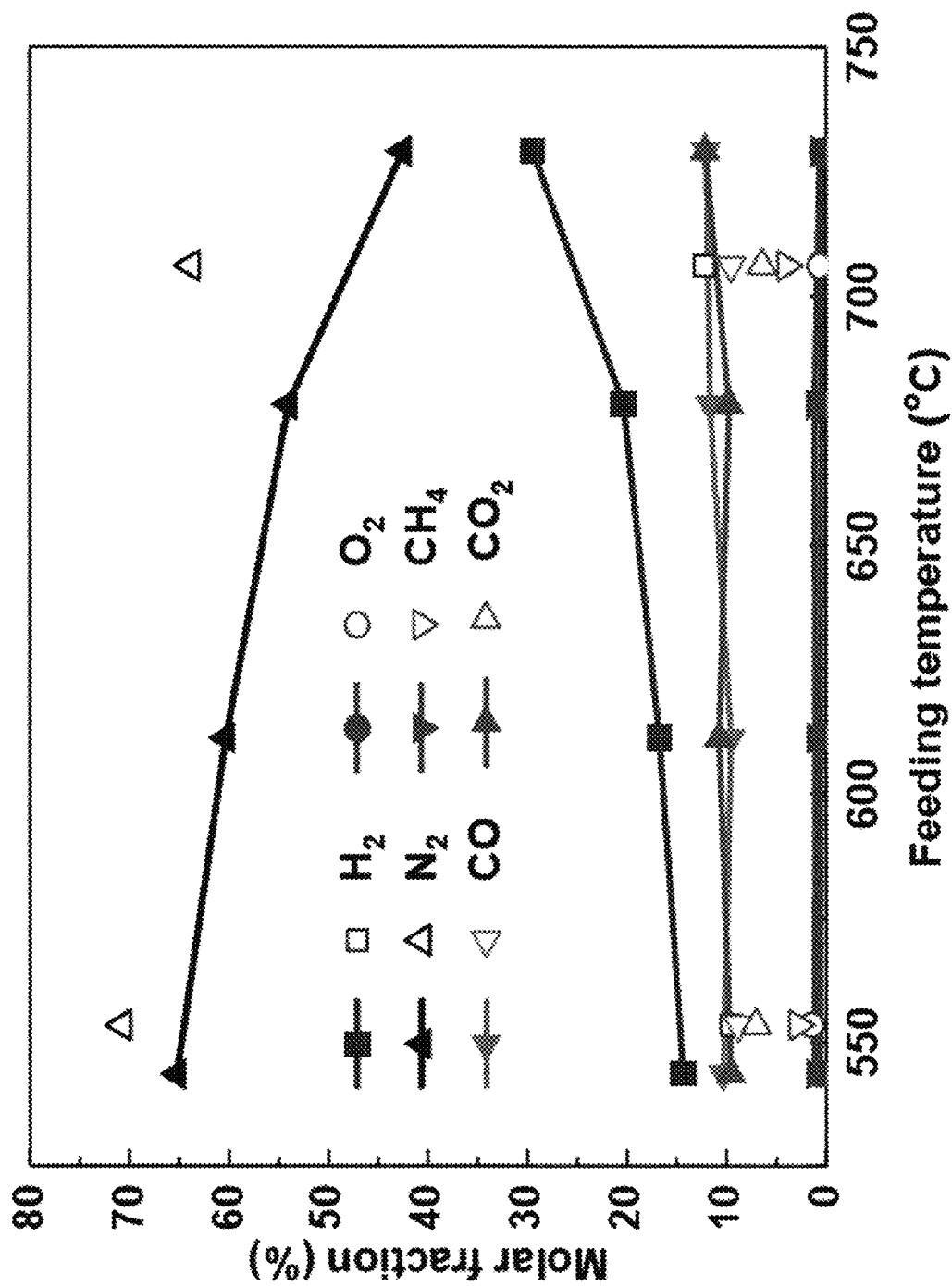
FIG. 10 Effect of feed temperature on reformate molar fraction with catalyst (solid symbols with lines), and blank test (open symbols). Fuel: desulfurized Jet A fuel, $O_2/C=0.5$, $H_2O/C=1.8$. In short.
Figure 11:
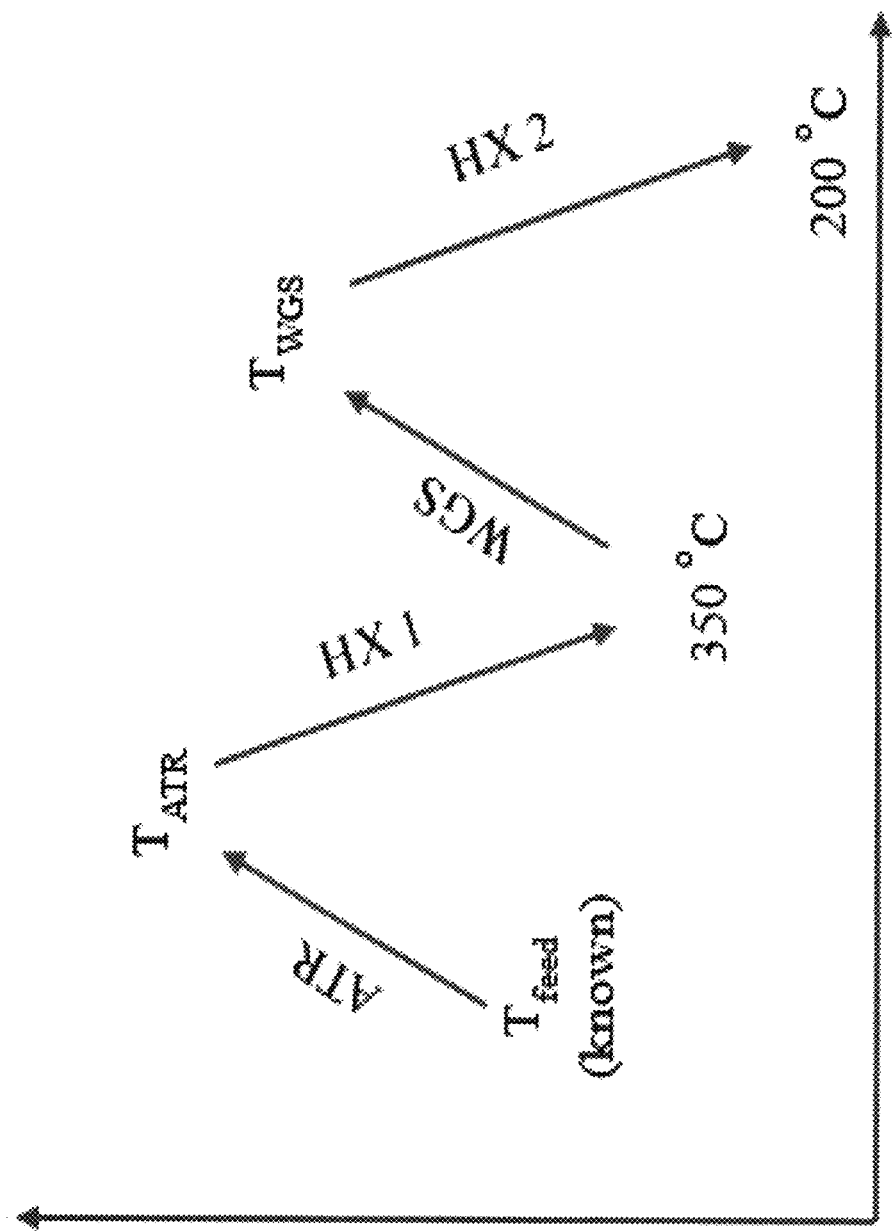
FIG. 11. Fuel processing system temperature evolution
Figure 12:
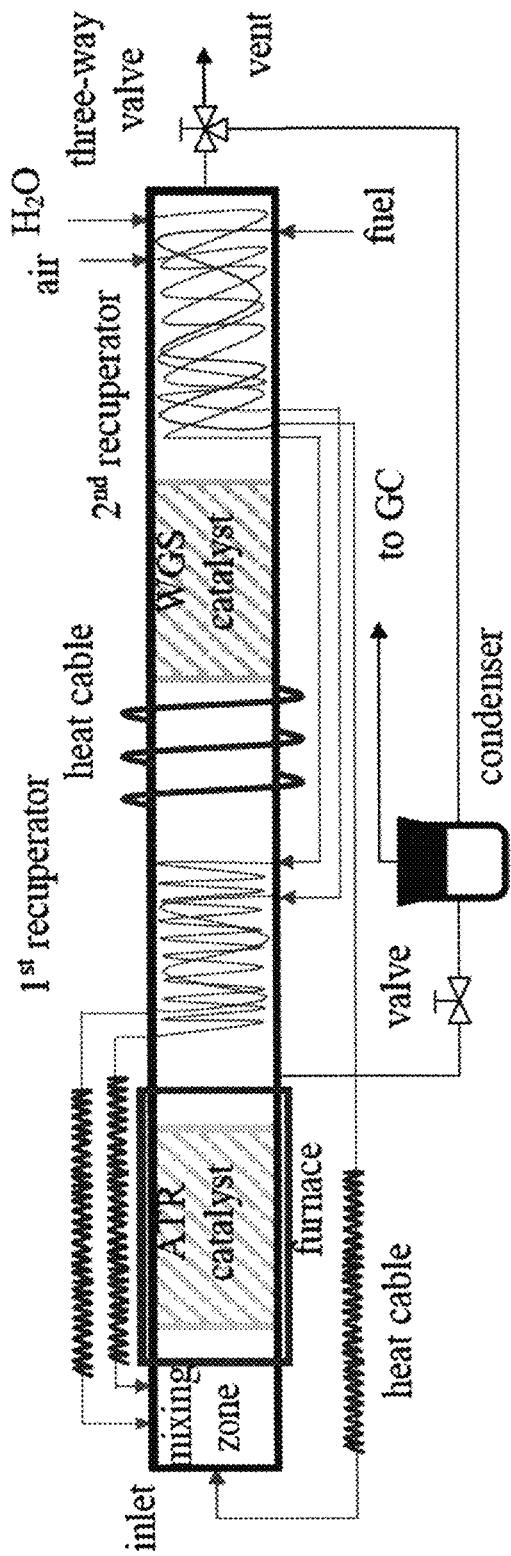
FIG. 12. Schematic of integrated fuel processor (an exemplary embodiment)
Figure 13:
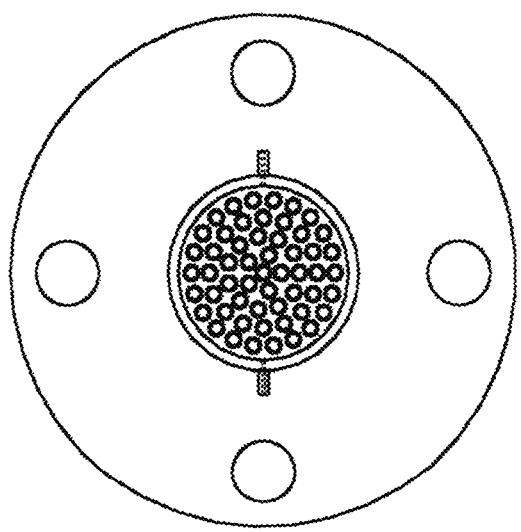
FIG. 13 SOLIDWORKS graph of fuel processor using 3D printing technique. (a) Cross-section view; (b) Overall system perspective view.
Figure 13:
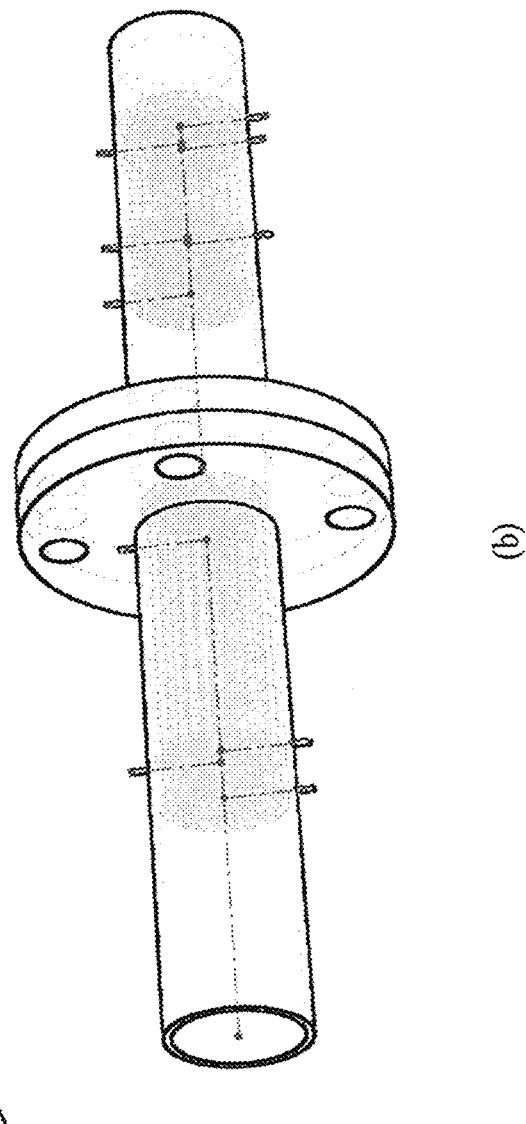

In further embodiments, the invention encompasses a compact unit according to FIG. 7.

Another aspect of the invention encompasses a method of converting a hydrocarbon to a hydrogen rich fuel comprising contacting said hydrocarbon with a unit.

The inventors found that recuperators may be used to control the temperature of feed-in fuel, air, and steam for the ATR, and also the reformate entering to WGS reactor. Further, the temperature control allows the best reaction kinetics and conversion of hydrocarbon fuel into hydrogen rich fuel.

Another aspect of the invention encompasses a method of converting a hydrocarbon to a hydrogen rich fuel comprising:
  contacting said hydrocarbon with a hydrocarbon auto-thermal reformer (ATR) to obtain a reformate,
  passing the reformate through a first heat recuperator;
  optionally, adding extra water;
  passing the reformate through a water-gas shift reactor for CO to react with $H_2O$ and obtaining more $H_2$;
  passing the reformate through a second heat recuperator;
  optionally removing sulfur and/or sulfur compounds, or a mixture thereof;
  isolating a hydrogen rich fuel product.

In some embodiments, the hydrocarbon is jet fuel, dodecane, diesel, gasoline, ethanol, or methanol, or mixtures thereof. In some embodiments, the hydrocarbon is Jet A fuel, Jet A-1 fuel, or Jet B8 fuel.

In some embodiments, the hydrocarbon auto-thermal reformer is operated at temperature from about 500° C. to about 700° C. In further embodiments, the hydrocarbon auto-thermal reformer is operated at temperature from about 450° C. to about 750° C.

In some embodiments, the reformate is cooled to a temperature from about 250° C. to 350° C. In some embodiments, the reformate is cooled to a temperature from about 200° C. to 400° C.

Another aspect of the invention encompasses a method of removing sulfur from a sulfur laden feed comprising contacting a sulfur laden feed with a compact unit as disclosed herein. In some embodiments, the sulfur laden feed comprises propane, natural gas, or jet fuel. In further embodiments, the jet fuel further comprises one or more synthetic paraffinic kerosene (SPK).

Another aspect of the invention encompasses a method of using a compact reformer for thermal management comprising contacting a hydrocarbon with a compact unit as disclosed herein, and optionally removing sulfur components to obtain a hydrogen rich gaseous fuel.

Another aspect of the invention encompasses a method of using a compact reformer for thermal management comprising contacting a hydrocarbon with a compact unit of FIG. 4, or FIG. 7, and optionally removing sulfur components to obtain a hydrogen rich gaseous fuel.

Another aspect of the invention encompasses a method of preparing a compact unit comprising assembling a hydrocarbon fuel auto-thermal reformer (ATR), a water-gas shift (WGS) reactor, and two heat recuperators into one compact unit. For example, the recuperators may be fabricated using 3D printing technology.

On advantage of the compact units of the invention is that they are easy and quick to assemble.

In some embodiments, the method of preparing a compact unit may further addition of an injection unit, and uniform distribution of feeding air from four evenly distributed circumferential locations, and for steam.

Electrochemical Hydrogen Compressor

One aspect of the invention encompasses an electrochemical hydrogen compressor comprising an inorganic-organic composite polymer membrane on a high strength porous current collecting support. In further embodiments, suitable flexible polymer components, such as polymer filled indium tin pyrophosphate and stable phosphonated ammonium organics may be used. Furthermore, the electrochemical hydrogen compressor may further comprise one or more metal foils. These metal foils can provide the necessary high strength and ductility for the desired high pressure (>12500 psi of gas pressure). The metal foil may include nickel.

Another aspect of the invention encompasses use of an electrochemical hydrogen compressor disclosed herein for energy storage and for power generation. A differentiating competitive advantage of the invention (when compared with traditional stationary fuel cell systems) is that the invention promotes low-cost alternative power with affordable capital installation costs for each customer without efficiency loss. Another advantage of the invention is the intrinsically higher efficiency for compressing hydrogen over a mechanical compressor, even when using proton-conducting membranes which are not acceptable for fuel cell application.

One aspect of the invention encompasses a method of compressing hydrogen comprising using an electrochemical hydrogen compressor comprising one or more proton conducting membranes. In some embodiments, the proton conducting membrane stably operate with no humidity up to 50% RH at temperatures from sub ambient (0° C.) to over 170° C. and pressures from 1 bar (atmospheric pressure) to 875 bar with a modest supply voltage and at high fluxes meeting a flux of >1 kg/hour at 875 bar with an energy consumption of 1.4 kWh/kg.

Composite Membrane

In some embodiments, the electrochemical hydrogen compressor comprises an inorganic-organic composite membrane, wherein said membrane comprises:
  1) an organic proton conductor (e.g., derived from polyvinyl pyridinium phosphate (PVPP)); and
  2) an inorganic proton conductor (e.g., derived from indium tin phosphate (ITP) such as ceramic ITP).

In some embodiments, the inorganic-organic composite membrane conducts only protons with no electroosmotic drag of molecular species, like water, and operates from at least room temperature. In further embodiments, the inorganic-organic composite membrane operates from at least room temperature to about 150° C. In further embodiments, the inorganic-organic composite membrane operates above about 150° C. In further embodiments, the HC comprises an inorganic-organic composite membrane, wherein there is no need for hydration and no degradation of membrane properties (e.g., from leaching of ions) for RH up to 50%.

In further embodiments, the HC comprises an inorganic-organic composite membrane, wherein the membrane operates from at least room temperature to about 150° C.; and wherein there is no need for hydration and no degradation of membrane properties (e.g., from leaching of ions) for RH up to 50%.

In further embodiments, the HC comprises an inorganic-organic composite membrane, wherein the membrane operates above 150° C.; and wherein there is no need for hydration and no degradation of membrane properties (e.g., from leaching of ions) for RH up to 50%.

In further embodiments, the HC comprises an inorganic-organic composite membrane, wherein the membrane operates from about −10° C. to about 220° C.; and wherein there is no need for hydration and no degradation of membrane properties (e.g., from leaching of ions) for RH up to 50%.

In further embodiments, the HC comprises an inorganic-organic composite membrane, wherein the membrane operates from about −10° C. to about 220° C.

In some embodiments, the inorganic-organic composite comprises a ratio of inorganic component and organic component of no more than 90 wt. % inorganic and no less than 10 wt. % organic component. In further embodiments, the ratio is about 70% inorganic component and about 30% organic component. In further embodiments, the ratio is about 65-75% inorganic component and about 35-25% organic component. In further embodiments, the ratio is about 60% inorganic component and about 40% organic component. In further embodiments, the ratio is about 75 to about 90 wt. % of inorganic component and the organic polymer is between about 25 to about 10 wt. %. The wt. % of the inorganic and organic components disclosed herein is based on the membrane mass Another aspect of the invention encompasses an electrochemical hydrogen compressor comprising a high temperature (e.g., able to operate at about 100 to about 150° C.) inorganic and organic proton conducting composite membrane.

Another aspect of the invention encompasses an electrochemical hydrogen compressor comprising a high temperature (e.g., able to operate at about −10 to about 220° C., where the current according the Arrhenius rate law) inorganic and organic proton conducting composite membrane. In some embodiments, the high temperature is able to operate between about −10° C. to about 5° C. In some embodiments, the high temperature is able to operate between about 5° C. to about room temperature. In some embodiments, the high temperature is able to operate between about room temperature to about 220° C. In some embodiments, the high temperature is able to operate between about room temperature to about 180° C. In some embodiments, the high temperature is able to operate between about 100° C. to about 180° C. In some embodiments, the high temperature is able to operate between about 150° C. to about 180° C.

In some embodiments, the composite membrane as used in the compressor disclosed herein comprises a polymer comprising phosphated ammonium pendant groups that give proton conductivity. In further embodiments, the composite membrane used in the compressor disclosed herein comprises a poly-phosphazene. In further embodiments, the membrane composite as used in the compressor disclosed herein comprises a poly-phenylene backbone.

Porous Support

Due to the pressure $H_2$ gas generated at the cathode and the mechanical properties of an inorganic filled polymer membrane, the inventor developed a high strength porous support to support the anode side of the membrane and prevent rupture of the membrane. In some embodiments, the electrochemical compressor comprises a porous high strength metal foil or screen (e.g., made of a dimensionally stable anode which is ruthenium oxide on titanium, or titanium, or nickel) to support the composite membrane at the anode. This porous high strength support may also be used at the cathode (if needed). In some embodiments, the metal support is a porous metal foam. In further embodiments, is a nickel foam. In further embodiments, is a nickel foam has >96% porosity and is 96 cm wide and 0.3 to 5 mm thick with vertical tensile strength >130 N/cm$^2$ and horizontal >100N/cm$^2$.

One aspect of the invention encompasses an electrochemical hydrogen compressor comprised of an inorganic-organic composite membrane and a porous metal support.

One aspect of the invention is the creation of a suite of hydrogen compressors for storage of energy for a number of applications from hand held to automotive portable power and residential and larger scale distributed generation. It will also find dual use in fuel cells for generation of electrical power from the high-pressure stored hydrogen as well as purification of hydrogen used in industrial applications. In some embodiments, the HC may be used in hand held or automotive portable power source. In further embodiments, the HC may be used in hand held or automotive portable power source.

In further embodiments, the HC may be used in residential and larger scale distributed generation.

In further embodiments, the HC may be used in a fuel cell for generation of electrical power from the high-pressure stored hydrogen.

In further embodiments, the HC may be used for purification of hydrogen used in industrial applications.

Catalysts

Various catalysts (derived from precious and non-precious metals that adsorb hydrogen on their surfaces) may be used to catalyze oxidation reaction at the anode and the reduction (to form hydrogen gas) at the cathode in the electrochemical hydrogen compressors disclosed herein. For example, the following catalysts (or derivatives thereof) may be used to catalyze reactions at the cathode and/or anode: nickel, palladium, silver, gold, platinum, platinoids, dimensionally stable anode (DSA), etc.

Another aspect of the invention encompasses an electrochemical hydrogen compressor (HC) comprising a proton-conducting polymer electrolyte membrane (PEM). In some embodiments, the electrochemical hydrogen compressor comprises a membrane comprising a cell, which is comprised of an inorganic polymer and an organic polymer. The inorganic polymer and the organic polymer may be a homogenous mixture. In further embodiments, the inorganic polymer is based on ceramic, inorganic polymer 10 mol % indium 90% tin phosphate ($In_{0.1}Sn_{0.9}P_2O_7$ or ITP for short). In further embodiments, the organic polymer is based on quaternary ammonium (QA)-biphosphate ion-pair-coordinated polyphenylene (PA-dopedQAPOH).

In some embodiments, the electrochemical hydrogen compressor comprises a proton-conducting polymer electrolyte membrane (PEM), wherein said membrane is impermeable to molecular hydrogen ($H_2$).

In some embodiments, the electrochemical hydrogen compressor comprises a PEM, wherein the PEM is mounted on a high-strength porous current-collecting support at the anode.

In some embodiments, the electrochemical hydrogen compressor comprises a PEM membrane comprising a cell, wherein said cell comprises an inorganic polymer and an organic polymer. The inorganic polymer and the organic polymer may be a homogenous mixture. In further embodiments, the cell comprises a homogeneous blend of about 70 to about 90 wt. % inorganic polymer and about 30 to about 10% organic polymer. In further embodiments, the cell comprises an amount of an inorganic and organic mix that would prevent the membrane from being extruded through the pores of the high strength porous metal.

In some embodiments, the cell comprises a homogeneous blend of about 70 to about 90 wt % inorganic (ITP) and about 30 to about 10% organic polymer (like phosphate amine).

Another aspect of the invention encompasses a method of preparing high-pressure hydrogen gas using a HC comprising:
   (a) oxidizing low-pressure hydrogen ($H_2$) gas on an anode to protons ($H^+$), and
   (b) conducting protons ($H^+$) a cathode; and
   (c) reducing protons ($H^+$) to obtain high-pressure hydrogen gas.

In further embodiments, the electrochemical hydrogen compressor may comprise a composite membrane mounted on a high-strength porous current-collecting support at the anode.

Figure 15:
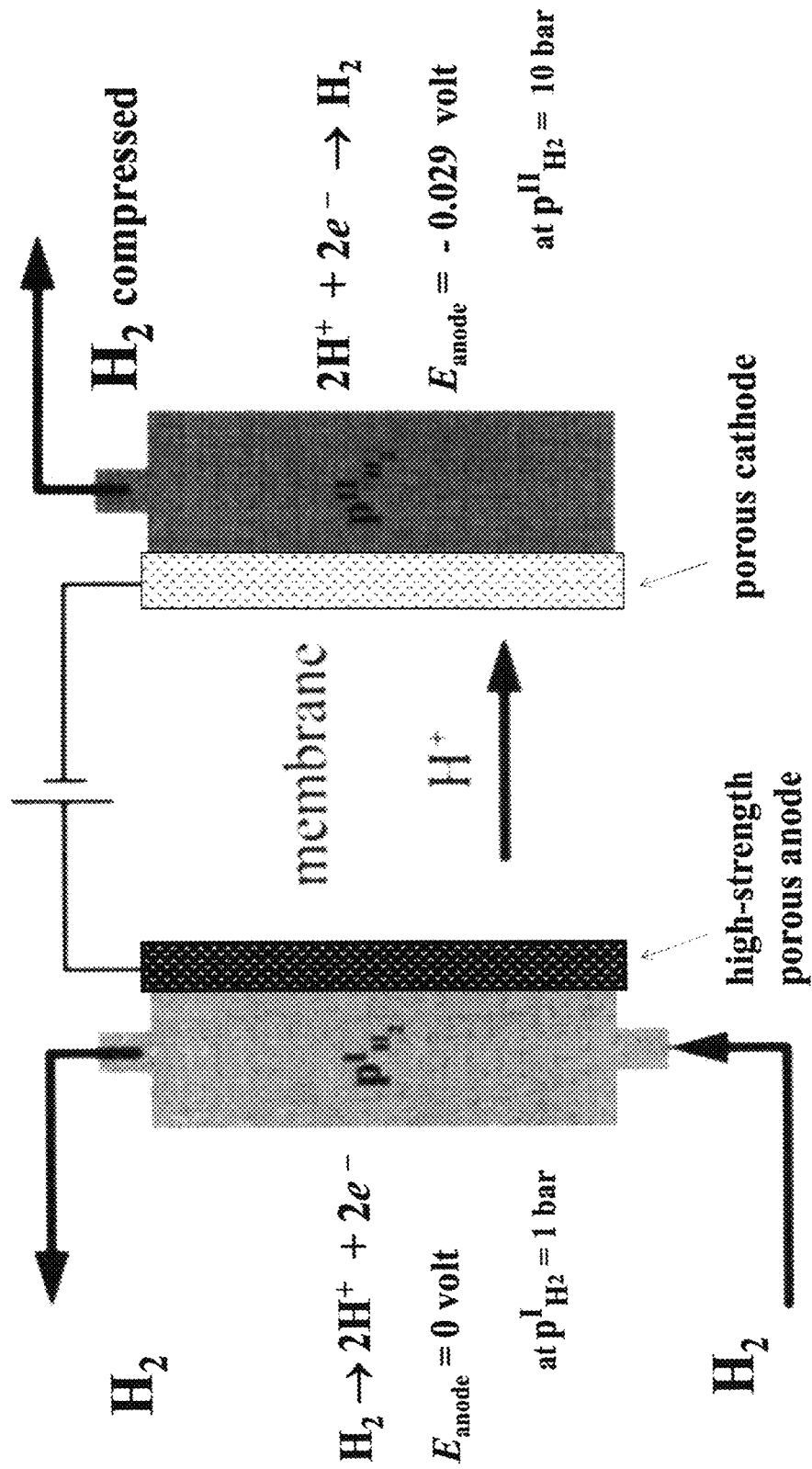
FIG. 15. Schematic of an exemplary embodiment of an electrochemical hydrogen compression single cell of the invention

A method of preparing an electrochemical hydrogen compressor (HC) comprising an inorganic-organic composite proton-conducting polymer electrolyte membrane (PEM) in a membrane electrode assembly (MEA), where the MEA is a three-layer laminate of anode, membrane and cathode. In some embodiments, the HC comprises a cell is made when an electro oxidation and reduction catalyst, such as platinum (Pt), is directly coated on the high strength porous metal support, like a porous nickel foil, which may be used at both the anode and cathode on each side of the composite membrane and in which the foil has smaller pores than the pore size of the inorganic ceramic powder. In some embodiments, hydrogen is compressed when a voltage is applied across a cell, and this compression is calculated from the Nernst equation. In some embodiments, the cathode is Pt-catalyzed but could also be. In further embodiments, the anode is Pt-catalyzed. Although Pt is the preferred catalyst, any catalyst which oxidizes hydrogen to proton, such as, palladium (Pd), nickel (Ni), silver (Ag), palladium, nickel, silver, cobalt, and cobalt and iron, other transition metal complexed to porphyrins, phthalocyanines or other macrocycles and their pyrolysis products, may be used at the anode, and any catalyst that reduces proton to hydrogen, like palladium (Pd), nickel (Ni), silver (Ag), palladium, nickel, silver, cobalt, and cobalt and iron, other transition metal complexed to porphyrins, phthalocyanines or other macrocycles and their pyrolysis products, may be used at the cathode One aspect of the invention encompasses an electrochemical hydrogen compressor (HC) according to FIG. 15.

EXAMPLES

Example 1

Preparation of Inorganic Polymer is Based on a Ceramic, Indium Tin Pyrophosphate (ITP) (an Exemplary Inorganic Polymer)

The inorganic polymer is based on a ceramic, indium tin pyrophosphate (ITP). ITP is made from a mass of indium oxide, 0.5027 g, tin oxide, 4.8933 g and aqueous phosphoric acid (85 wt %) 12.1685 g reagents were mixed by hand in a ceramic crucible with a stirring rod at 300C for approximately 1 hr to form a ceramic "dope". This dope was then calcined in the crucible (uncovered) at 650° C. for 2.5 hrs Example 2

A typical reformate obtained from the ATR performance test consists of 29.2% $H_2$, 9.1% CO, 14.2% $CO_2$, 43.9% $N_2$, unreacted steam and fuel, as well as traces amount of $O_2$ and $CH^4$. It can be directly passed to an SOFC since $H_2$ and CO are both eligible fuel. Nevertheless, it would bring troubles if a PEMFC is placed downstream, as CO could significantly poison the anode catalyst. Although high temperature PEM (HT-PEM) fuel cells may have better CO-tolerance capability for as high as 4-5% at 200° C., effective CO removal techniques must be carried out before the reformate fueling to the fuel cell. Water-gas shift reaction shown in Eq. 6 is an attractive way to consume CO and further increase the $H_2$ yield.

Example 3

Figure 6:
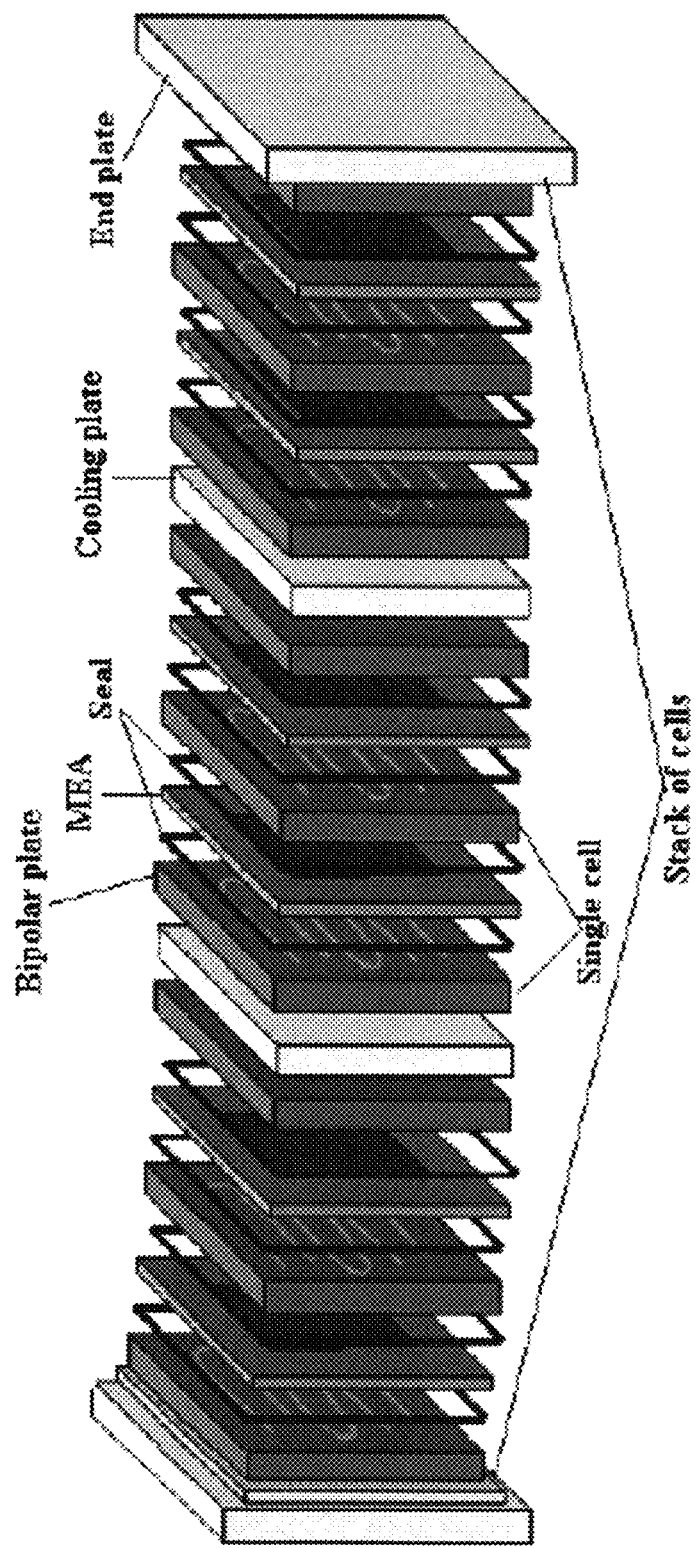
FIG. 6. An exemplary PEM fuel cell stack hardware.

The proposed fuel processing system consists of the injection section, an ATR reactor, a WGS reactor, two countercurrent flow heat exchangers and the test section, as is shown in FIG. 6. Three reactants, fuel, water and air are firstly passed through the two heat exchangers at the back part of the processor and get preheated by the exhaust heat of the products. Fuel is injected through a nozzle mounted in the middle of the front cap, which is particularly used to generate a uniform mist to enhance the mixing. After mixing with water and air in the mixing zone, the reactants are directly conducted to the ATR reactor. The ATR reactor is placed in a tubular furnace which is used to provide the required ATR reaction temperature. After the reaction, the reformate is passed through the first heat exchanger and then to the WGS reactor. Two specially designed recuperators were placed after the ATR reactor and WGS reactor respectively. Inside the recuperators, ⅛ in. stainless steel coils were used to separate the bulk flow and the reactants. The surface areas of the coils were predicted based on the heat transfer empirical equations which were discussed in the next section. This special shell-and-tube recuperator is designed for easy assembly and better heat exchanging between liquid reactants (water and jet fuel) and gaseous bulk flow. In order to monitor the temperature gradient, thermocouples (K type) were inserted before and after each of the coils (shown in FIG. 6). To investigate water content effect to the WGS reaction without affecting the upstream reaction, an extra feed of water can be injected right before the WGS reactor as needed. A heating cable is wired outside of the WGS reactor to compensate for the heat loss and provide the required reaction temperature. A three-way valve and a regular valve were used to regulate the flow direction so that either the ATR reformate or the effluent (overall system product) was able to be analyzed solely through GC system. Any water, unreacted fuel or other liquids were removed by the absorbents filled in the condenser. Temperatures at different locations were monitored to display the longitudinal temperature gradient distribution in the system. All the reactors, passages, connectors before the test section are made of stainless steel for better heat transfer and higher temperature/pressure resistance. Insulation is performed by enclosure of thick glass fibers to the outside of the exposed parts.

Example 4

To study the process in the lab, a $kW_{th}$-class fuel processing system consisted of the injection section, ATR reformer, WGS reactor, two countercurrent flow heat exchangers and test section was designed and fabricated based on carefully addressing the issues such as injection and mixing strategy, heat loss compensation, assembly accessibility, etc. An in-house-made ATR catalyst supported on industrial-level cordierite honeycomb monolith was prepared with inexpensive precursors by impregnation method.

After the simplified system was assembled and protected with thick-layer insulation, experimental test was conducted to evaluate the performance of ATR process. Preliminary study was carried out on the autothermal reforming of n-dodecane which is working as the surrogate of Jet A fuel. Over 40% $H_2$ molar fraction and over 85% fuel conversion as well as energy efficiency were achieved within the wide temperature range of 500-750° C. at the ratios of $H_2O/C=1.8$ and $O_2/C=0.5$. However, with similar operating conditions, the autothermal reforming of Jet A fuel was proved to be more difficult than the pure hydrocarbon. The best ATR performance was obtained at the feeding temperature of 696° C., $H_2O/C=2.5$ and $O_2/C=0.5$, with the reformate composition yielding, $H_2$ 29.2%, $O_2$ 0.3%, $N_2$ 43.9%, $CH_4$ 0.5%, CO 9.1% and $CO_2$ 14.2%. The three indices fuel conversion, $H_2$ yield and energy efficiency were then computed based on definition as 0.89, 1.44 and 0.65, respectively. Experimental results also show that coke formation can be suppressed dramatically at low temperature, high $H_2O/C$ and high $O_2/C$.

Example 5

Self-sustainability analysis is performed based on the simplified model including, an ATR reformer, a WGS reactor and two recuperators. Three principal energy aspects are considered at steady state, 1) the preheating energy (Qpreheat) to preheat the three reactants from room temperature to the desired feeding temperature, 2) the maximum exchanging energy (Qexchange1) that can be provided by the reformate to cool down from the ATR reaction temperature to the WGS reaction feeding temperature in the first recuperator, and 3) the maximum exchanging energy (Qexchange2) than can be provided by the overall product to cool down from the WGS reaction temperature to the final temperature which is also the operating temperature for the fuel cell in the secondary recuperator. The excess heat was then defined by the following equation:

$$Q_{excess} = Q_{exchange1} + Q_{exchange2} - P_{reheat}$$

Example 6

Preparation of Composite Membrane

Blend 1) an organic proton conductor and 2) an inorganic conductor and optimize for best H+ conduction and minimal $H_2$ permeation through the membrane to obtain to obtain an organic and inorganic composite membrane.

Preparation of Porous Support

Start with a high-temperature (e.g., 100 to 150° C.) solid proton-conducting inorganic-organic composite membrane, which needs to water or other solvent for high proton conductivity. This composite membrane is made of the organic polymer, as exemplified by, polyvinyl pyridinium phosphate (PVPP, which is a non-leachable water-free proton conductor made from commercially available polyvinyl pyridine (PVP) and phosphoric acid and indium tin phosphate (ITP). A porous high strength metal foil or screen (e.g., made of dimensionally stable anode which is, e.g., ruthenium oxide on titanium or titanium or nickel) supports the composite membrane at the anode. This metal support will prevent a hole in the membrane due to the blowing through of the high pressure of hydrogen gas generated at the cathode. Particle size of the inorganic component, as exemplified by ITP, is selected (ground and sieved) to be larger than the pores of the metal support so the composite membrane will not be pushed through the pores of the support. The organic polymer will fill and be mechanically interlocked inside the ITP to assure there is no permeation of hydrogen through the pores of the inorganic ITP component.

The inorganic-organic membrane, as exemplified by PVPP/ITP membrane, is used to develop the structure of the hydrogen compressor.

Example 7

Synthesis of ITP-Containing Membrane Powder

Polymer membrane fabrication methods and ITP powder properties are important to form a high-performance device. This includes the synthesis of the ITP powder, the blending into the polymer, and the forming of the membrane.

ITP powder is prepared using high purity $SnO_2$ and $In_2O_3$ starting powders. The target ITP is $Sn_{0.9}In_{0.1}P2O_7$. Starting powders is wet mixed in 85% $H_3PO_4$ at about 300° C. for about one hour. The resulting paste is calcined at 650° C. to produce crystalline ITP. Powders is characterized to verify ITP formation.

If the formation is incomplete, the powders may be ball milled, pressed into pellets, and calcined through a second cycle to ensure a highly uniform ITP powder. All powders are ball milled and sieved prior to blending with the organic polymers. The powder synthesis and preparation may occur using existing powder milling and furnaces.

The particle size of the inorganic ITP is selected (ground and sieved) to be larger than the pores of the metal support so the composite membrane will not be pushed through the pores of the support. The organic polymer will fill and be mechanically interlocked inside the ITP to assure there is no convection or diffusion (permeation) of hydrogen through the pores of the inorganic ITP composite.

Fabricating the Membrane

A method for fabricating the membrane is using a low equivalent weight Nafion type polymer (from e.g., 3M) that has been converted from an acid form to a protic salt form, then solution casting the organic polymer on to the electrode. This ensures the catalyst is wetted by the organic polymer. Another method is to make a catalyst organic polymer paste and apply it to carbon paper. In either case the membrane is made of the blended composite and then the electrode with organic polymer is pressed to the ITP and organic composite membrane. The membrane thickness also has to be controlled in the processing. Thickness is varied while maintaining the desired composition by different techniques, like solution casting with a doctor blade, in conjunction with the above methods.

Example 8

Assembly of Membrane, Catalyst and Metal Support Combination

A test cell is fabricated using the membrane material and the support foam. The initial cell design will resemble a fuel cell. The cell consists of a proton-conducting membrane in between two Pt-catalyzed porous gas fed carbon-cloth electrodes supported by high-strength metal-foam current-collectors.

This membrane electrode assembly (MEA) is sealed into endplates using viton gaskets. The anode is fed low-pressure hydrogen using a serpentine flow field in graphite as is often found in fuel cells. The cathode will initially have a similar serpentine flow field in a graphite plate for the exiting high-pressure hydrogen gas.

Example 9

Multicell Designs

The multi cell design is used to step up pressure. For example, cell one could start at ambient pressure (0 psig) and pressurize to 400 psig and this would be the input to the next cell which would start at 400 psig and pressurize to 800 psig, etc. until the desired 12,500 psig is achieved. This would mean a 40-cell stack may be required (which is reasonable). This would minimize stresses in each cell.

End sealing each cell may be a challenge especially at higher pressures and most likely would be metal seal gaskets. The metal sheets would be porous in the middle but solid on the periphery would seal the $H_2$ at high pressure. A dense flexible gas tight insulating Kapton (high temperature stable poly imide membrane) or a flexible Kapton/alumina ceramic gasket/spacer would be needed between the metal seals to ensure the stack has a gas seal with no $H_2$ leakage and cells are not shorted All publications mentioned herein are incorporated by reference to the extent they support the present invention.

REFERENCES

A number of patents and publications are cited above in order to more fully describe and disclose the invention and the state of the art to which the invention pertains. All publications mentioned herein are incorporated by reference to the extent they support the present invention.

I claim:

1. An electrochemical hydrogen compressor comprising:
a membrane electrode assembly that includes
a composite proton-conducting polymer electrolyte membrane comprising an inorganic polymer and an organic polymer; and
first and second metal-catalyzed electrodes sandwiching said composite proton-conducting electrolyte membrane therebetween,
wherein the compressor is configured as a part of a fuel cell to operate at a gas pressure exceeding 12500 psi and a porous electrode of the metal catalyzed electrodes is configured to prevent being ruptured by the membrane at said gas pressure.

2. The electrochemical hydrogen compressor according to claim 1, wherein said inorganic polymer comprises ceramic, inorganic polymer 10 mol % indium 90% tin phosphate ($In_{0.1}Sn_{0.9}P_2O_7$) having pores filled with an organic polymer.

3. The electrochemical hydrogen compressor according to claim 1, wherein the organic polymer comprises a quaternary ammonium biphosphate ion-pair-coordinated polyphenylene and the membrane is configured to operate at a temperature ranging from about 180 degrees C. to about 220 degrees C. with no water.

4. The electrochemical hydrogen compressor according to claim 1, wherein the composite proton-conducting polymer electrolyte membrane is impermeable to molecular hydrogen.

5. The electrochemical hydrogen compressor according to claim 1, wherein an anode includes a porous structural layer configured to collect current and configured to mount and support the composite proton-conducting polymer electrolyte membrane.

6. The electrochemical hydrogen compressor according to claim 1, wherein the membrane comprises a cell which comprises an inorganic polymer and an organic polymer.

7. The electrochemical hydrogen compressor according to claim 6, wherein the cell comprises a homogeneous blend of 70 to 90 wt. % of the inorganic polymer and 30 to 10% of the organic polymer.

8. The electrochemical hydrogen compressor according to claim 5, wherein a size of a pore of the porous structural layer is smaller than a size of a proton-conducting particle of said membrane.

9. The electrochemical hydrogen compressor according to claim 1, wherein the membrane is configured to operate without water and without losing proton-conductivity when exposed to water.

10. The electrochemical compressor according to claim 1, wherein the membrane comprises a blend of proton-conducting inorganic particles and proton-conducting organic particles configured to conduct only protons with no electroosmotic drag of molecular species.

11. The electrochemical compressor according to claim 10, wherein a size of a pore of an electrode is smaller than a size of a proton-conducting particle of said composite proton-conducting polymer electrolyte membrane.

12. The electrochemical compressor according to claim 1, wherein the composite proton-conducting polymer electrolyte membrane incudes at least proton-conducting inorganic particles and a composite anode including a porous metal foam, the porous metal foam configured to structurally support the membrane.

13. The electrochemical compressor according to claim 1, wherein the membrane contains an inorganic polymer having pores filled with an organic polymer, and said porous electrode including a metal foil.

14. The electrochemical hydrogen compressor according to claim 1, wherein each of the first and second metal-catalyzed electrodes is a porous electrode.

15. The electrochemical hydrogen compressor according to claim 1, wherein each of the inorganic polymer and the organic polymer includes a dry proton conductor material configured to conduct protons with no added solvent, and wherein each of the inorganic polymer and the organic polymer are configured to operate individually at a temperature from room temperature to about 220 degrees C. with no water.

16. A method of preparing high-pressure hydrogen gas using the compressor according to claim 1, comprising:
a. oxidizing low-pressure hydrogen gas at an anode to generate protons;
b. conducting the protons from the anode through the composite proton-conducting polymer electrolyte membrane according to claim 1 to a cathode; and
c. reducing the protons at the cathode to obtain the high-pressure hydrogen gas.

17. A method of preparing an electrochemical hydrogen compressor, wherein the electrochemical hydrogen compressor comprises a three-layer laminate comprising an anode, a cathode, and the composite proton-conducting polymer electrolyte membrane according to claim 1, the method comprising:
sandwiching the composite proton-conducting polymer electrolyte membrane between the anode and the cathode to form the three-layer laminate.

18. The method of claim 17, wherein reducing the protons at the cathode is catalyzed by Pt, Pd, Ni, Ag, or a combination thereof.

19. The method of claim 17, wherein the oxidation of the protons at the anode is catalyzed by Pt, Pd, Ni, Ag, or a combination thereof.

* * * * *